United States Patent
Wang et al.

(10) Patent No.: US 9,558,581 B2
(45) Date of Patent: Jan. 31, 2017

(54) METHOD FOR REPRESENTING VIRTUAL INFORMATION IN A REAL ENVIRONMENT

(71) Applicant: Metaio GmbH, Munich (DE)

(72) Inventors: Lejing Wang, Munich (DE); Peter Meier, Munich (DE); Stefan Misslinger, Munich (DE)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 14/654,402

(22) PCT Filed: Dec. 21, 2012

(86) PCT No.: PCT/EP2012/076707
§ 371 (c)(1),
(2) Date: Jun. 19, 2015

(87) PCT Pub. No.: WO2014/094881
PCT Pub. Date: Jun. 26, 2014

(65) Prior Publication Data
US 2015/0332505 A1   Nov. 19, 2015

(51) Int. Cl.
*G09G 5/00* (2006.01)
*G06T 15/06* (2011.01)
*G06T 19/00* (2011.01)

(52) U.S. Cl.
CPC ............ *G06T 15/06* (2013.01); *G06T 19/006* (2013.01)

(58) Field of Classification Search
CPC combination set(s) only.
See application file for complete search history.

(56) References Cited

U.S. PATENT DOCUMENTS

| 2002/0190995 A1* | 12/2002 | Lim | G06T 15/40 345/581 |
| 2009/0189898 A1* | 7/2009 | Dammertz | G06T 15/06 345/426 |
| 2011/0273575 A1* | 11/2011 | Lee | G01C 21/20 348/222.1 |

(Continued)

OTHER PUBLICATIONS

Bane et al. "Interactive Tools for Virtual X-Ray Vision in Mobile Augmented Reality", Mixed and Augmented Reality, Nov. 2, 2004, pp. 231-239.

(Continued)

*Primary Examiner* — M Good Johnson
(74) *Attorney, Agent, or Firm* — Blank Rome LLP

(57) ABSTRACT

A method for representing virtual information in a view of a real environment is provided that includes the following steps: providing a system setup comprising at least one display device, determining a position of a viewing point relative to at least one component of the real environment, providing a geometry model of the real environment, providing at least one item of virtual information and its position, determining a visualization mode of blending in the at least one item of virtual information on the display device according to the position of the viewing point and the geometry model, calculating a ray between the viewing point and the item of virtual information, and determining a number of boundary intersections by the ray, wherein if the number of boundary intersections is less than 2, the item of virtual information is blended in a non-occlusion mode, otherwise in an occlusion mode.

15 Claims, 16 Drawing Sheets

(56) References Cited

U.S. PATENT DOCUMENTS

| | | |
|---|---|---|
| 2012/0075341 A1 | 3/2012 | Sandberg |
| 2012/0113138 A1 | 5/2012 | Uusitalo et al. |
| 2012/0176410 A1 | 7/2012 | Meier et al. |
| 2013/0093787 A1* | 4/2013 | Fulks .................. G06T 11/60 345/629 |
| 2014/0043436 A1* | 2/2014 | Bell .................. H04N 13/0203 348/46 |

OTHER PUBLICATIONS

Grasset et al. "Image-Driven View Management for Augmented Reality Browsers", Mixed and Augmented Reality, Nov. 5, 2012, pp. 177-186.

Kalkofen et al. "Comprehensible Visualization for Augmented Reality", IEEE Transactions on Visualization and Computer Graphics, vol. 15, No. 2, Mar. 1, 2009, pp. 193-204.

Blackwell et al. "An Image Overlay System for Medical Data Visualization", Medical Image Analysis, Mar. 2000, vol. 4, No. 1, pp. 67-72.

Simon et al. "Beyond Location Based—The Spatially Aware Mobile Phone", Jan. 1, 2006, Web and Wireless Geographical Information Systems Lecture Notes in Computer Science, pp. 12-21.

Maas et al. "Dynamic Annotation of Interactive Environments Using Object-Integrated Billboards", Jan. 30, 2006, http://wscg.zcu.cz/wscg2006/Papers_2006/Full/A79-full.pdf.

Tenmoku et al. "Annotating User-Viewed Objects for Wearable AR Systems", Mixed and Augmented Reality, Oct. 5, 2008, pp. 192-193.

Bell et al. "View Management for Virtual and Augmented Reality", Proceedings of the 14th Annual ACM Symposium on User Interface Software and Technology, Nov. 11, 2001, pp. 101-110.

Hoellerer et al. "Mobile Augmented Reality", Telegeoinformatics: Location Based Computing and Services, 2004.

Feiner et al. "A Touring Machine: Prototyping 3D Mobile Augmented Reality Systems for Exploring the Urban Environment", Personal and Ubiquitous Computing 1.4 (1997): 208-217.

Woop et al. "RPU: A Programmable Ray Processing Unit for Realtime Ray Tracing", ACM Transactions on Graphics (TOG), vol. 24, No. 3, ACM, 2005.

Sutherland et al. "A Characterization of Ten Hidden-Surface Algorithms", 1974, ACM Computing Surveys vol. 6, No. 1.

"Point in Polygon, One More Time . . . ", Ray Tracing News, vol. 3, No. 4, Oct. 1, 1990.

Horvat, "Ray Casting Point-in-Polyhedron Test", 2012.

* cited by examiner

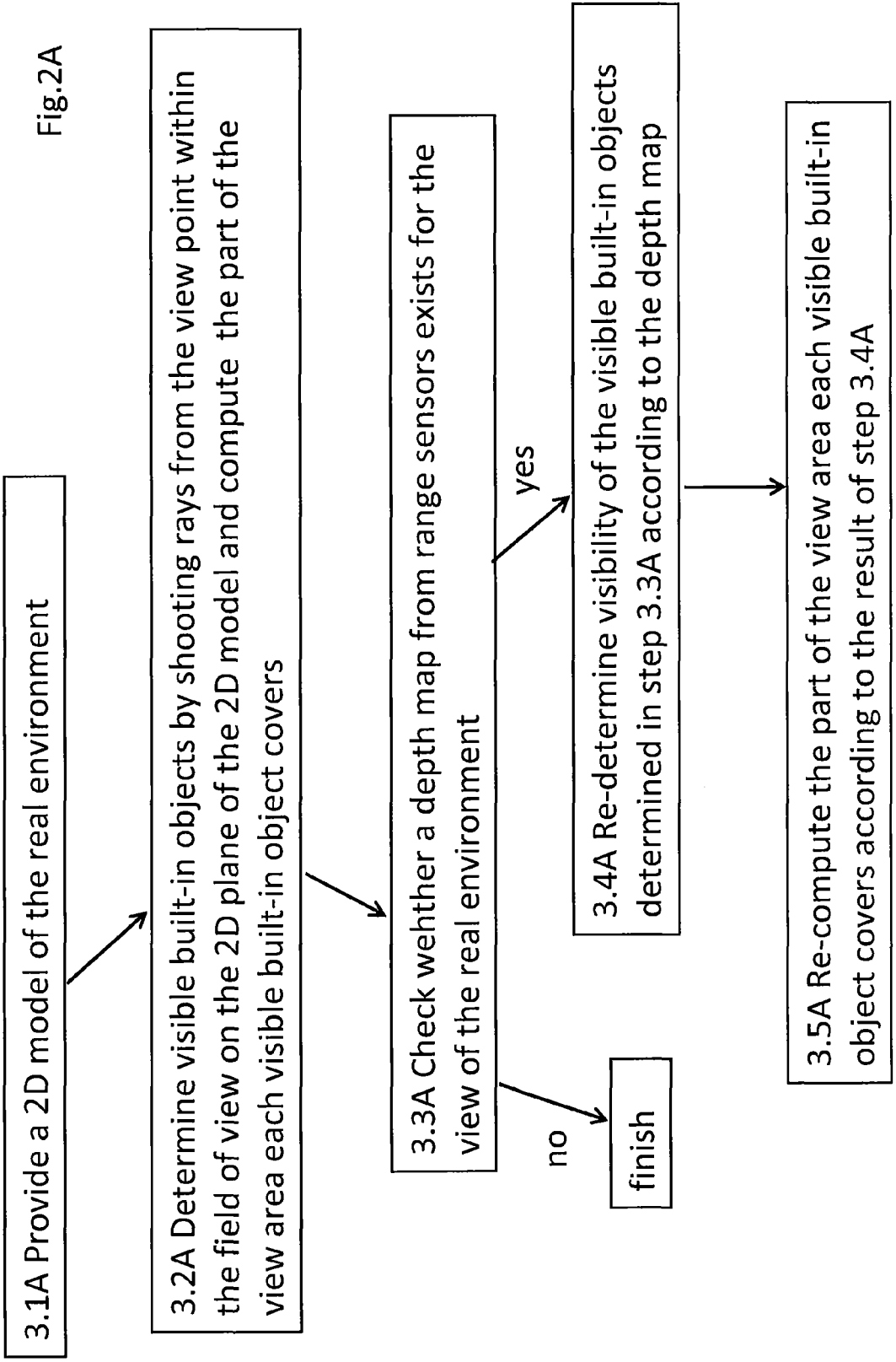

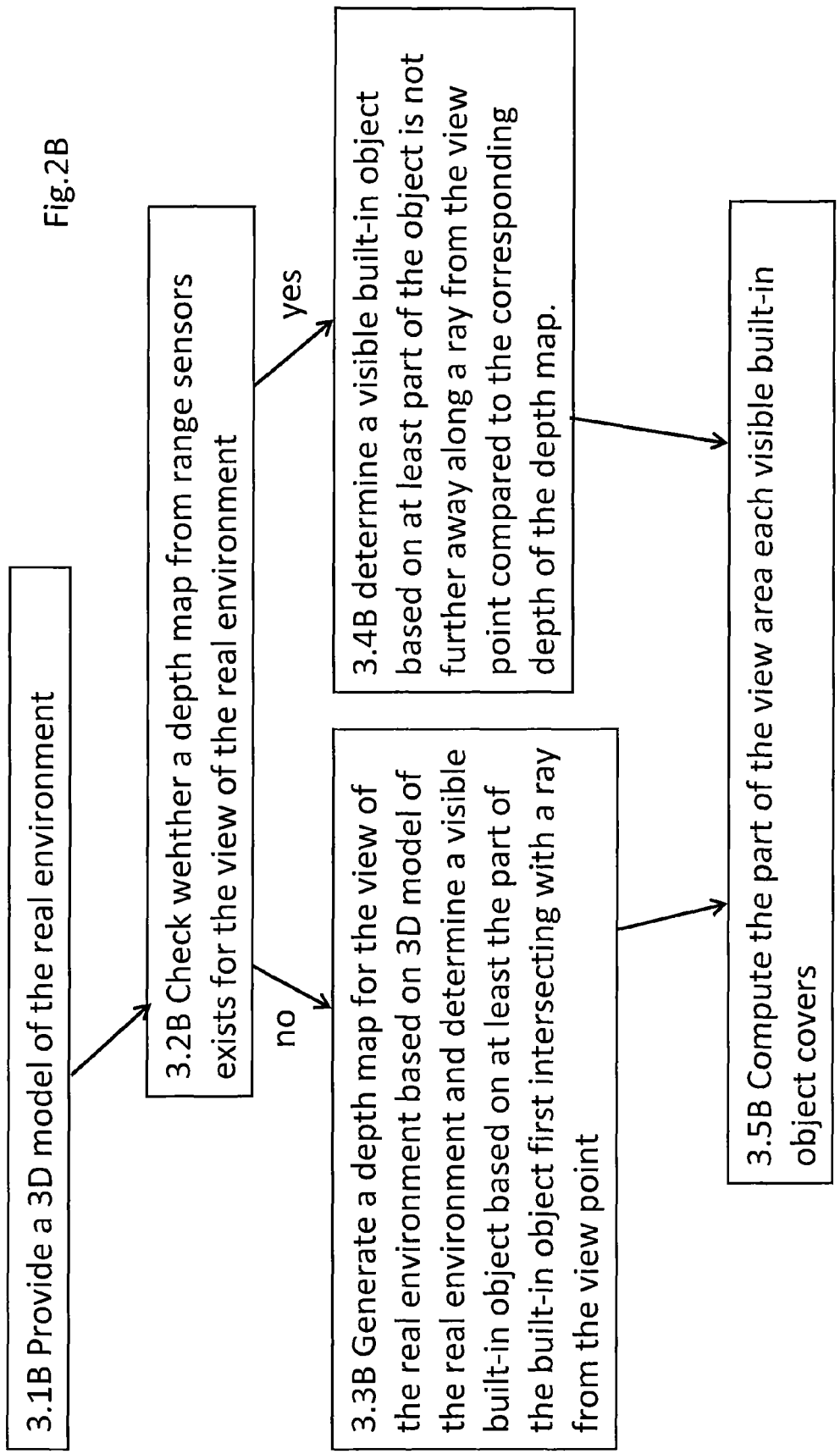

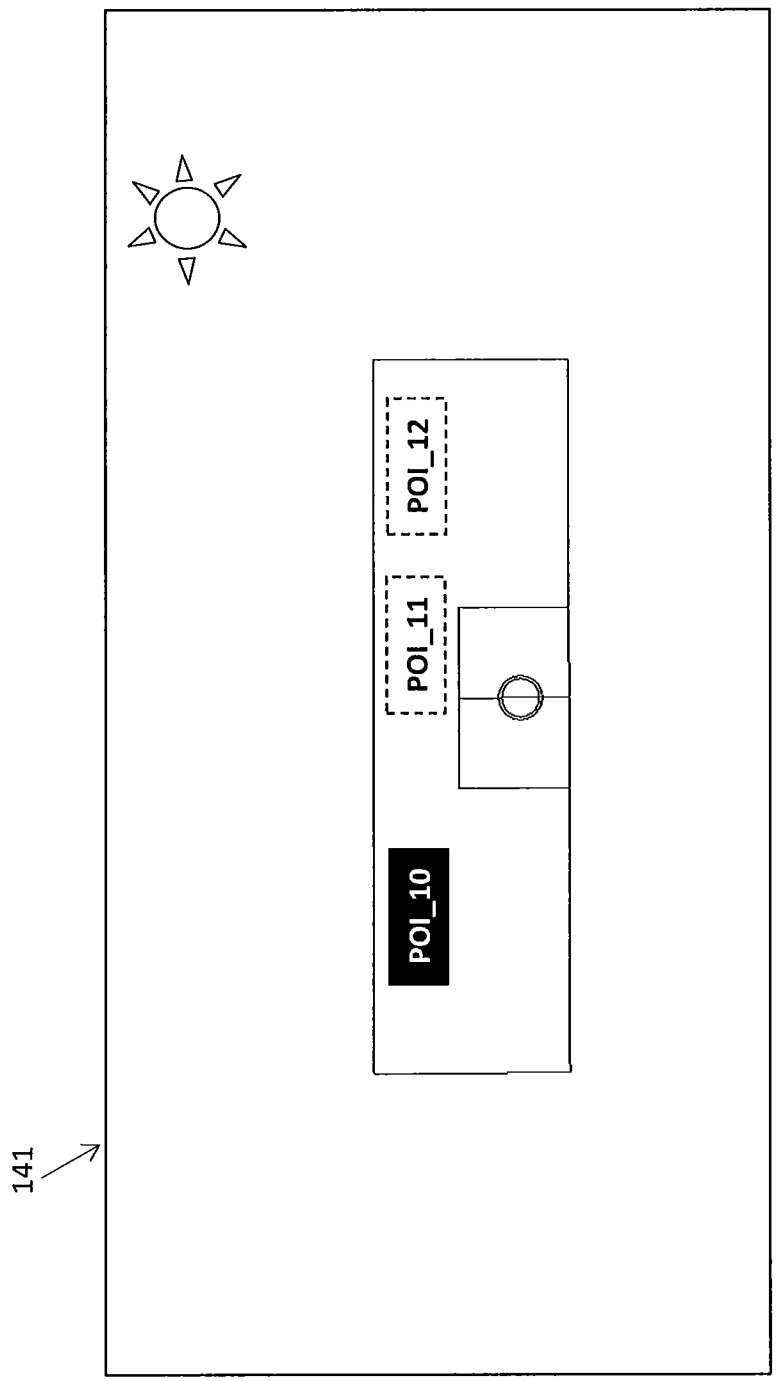

METHOD FOR REPRESENTING VIRTUAL INFORMATION IN A REAL ENVIRONMENT

This application is entitled to the benefit of, and incorporates by reference essential subject matter disclosed in PCT Application No. PCT/EP2012/076707 filed on Dec. 21, 2012.

BACKGROUND OF THE INVENTION

1. Technical Field

The invention relates to a method for representing virtual information in a view of a real environment comprising the steps of providing a system setup with at least one display device, wherein the system setup is adapted for blending in virtual information on the display device. The invention also relates to a computer program product comprising software code sections for performing the method.

2. Background Information

Augmented reality (AR) systems are known to enhance information of a real environment by providing a visualization of overlaying computer-generated virtual information with a view of the real environment or a part of the real environment. The virtual information can be any type of visually perceivable data such as objects, texts, drawings, videos, or their combination. The view of the real environment or the part of the real environment, as understood herein, could be perceived as visual impressions by user's eyes and/or be acquired as one or more images by a camera, e.g., worn by a user or attached on a device held by a user.

The overlaid or blended in virtual information may be, in principle, various items of virtual information. For example, an item of virtual information which could enhance information of a real environment may be a point of interest, as for example known in map or navigation applications. A point of interest (POI) may represent a location of a real object of the real environment (e.g., a building or a landmark) and often includes digital content that is related to the real object. For instance, the location is a global location (e.g., a geo-coordinate such as a 2D coordinate of longitude and latitude, or a 3D coordinate of longitude, latitude and altitude) or a postaddress (e.g., a floor number, street, postcode, country). The post address and the global location could be converted to each other. The digital content of the POI could contain various data, such as a name, description, and contact related to the real object.

One major function of augmented reality systems is to overlay items of virtual information, such as points of interest (POIs), to a view of the real environment. This is particularly useful and popular in location-based (mobile) augmented reality applications, such as tour guidance for exploring the urban environment, as described in references [1, 2, 4] as referred to herein at the end of the description. For example, users could use an augmented reality application to overlay POIs to a view of the real environment when they are in new places and want to obtain information about things they see. In augmented realty systems, the POI information has to be represented in the real environment or the part of the real environment such that it satisfies desired visual perception and usability. Most data sources for POI information provide the information in relation to a point in the real world, not as a 3d model with more than one point or vertex. This invention is well suited for handling the visualization of items of virtual information, which are described by latitude, longitude and optionally altitude and additional meta-information consisting of text and 2D image information.

Several methods have been developed for improving visual perception and usability of blending in or overlaying POI information to a view of a real environment in augmented reality applications.

View distance of a POI refers to a distance between the location of the POI and the location where a camera or a user stands. View direction of a POI refers to a direction from the location where a camera or a user stands to the location of the POI.

Hoellerer et al. in reference [4] propose to display POIs as virtual flags and labels in the correct perspective for the user's view pose, while the labels face the user and maintain their size irrespective of distance to ensure readability.

Augmented reality systems face significant technical challenges to more usefully display POIs to users. Uusitalo et al. in reference [1] disclose a method for displaying POI information based on partitioning of the real environment. The method determines to overlay one or more POIs based on the one or more partitions of the view of the real environment. They teach utilizing the knowledge of floor plan or height of a building to separate the building into partitions and overlaying the POIs to corresponding partitions in an image of the buildings.

When POIs have the same view direction, the POIs may be arranged behind with each other for display in augmented reality applications. In this regard, some of the POIs may not be visible, as it may be hidden behind other POIs. For this, Sandberg in reference [2] motivates grouping POIs that have the same view direction and then displaying the grouped POIs in a visible manner.

Meier et al. in reference [3] disclose a method to achieving an ergonomic representation of POIs in augmented reality systems, by subdividing the view of the real environment into a plurality of regions based on the distances of the regions to the view point.

Augmented reality systems commonly overlay the POIs opaquely on the top of a view of the real environment. An exemplary scenery is shown in FIG. 9, where POIs are overlaid as opaque labels 92, 93, 94, 95, 96, 97, 98, and 99 on the top of an image 81 of a real environment 51. In this way, the POI representations (e.g. the opaque labels) occlude the real environment or the part of the real environment in the image. Sandberg in reference [2] and Uusitalo et al. in reference [1] also overlay the icons and labels of the POIs opaquely to an image of a real environment. This introduces difficulties for the users to quickly and intuitively understand the real environment from the overlaid POIs.

Real objects of the real environment sometimes may not be visible in the view of the real environment, as the objects could be occluded by real objects placed in front of them from the view point. An example is shown in FIG. 8 (showing the scene of FIG. 9 without POIs), where a real object (building) D (cf. FIG. 7) in the real environment 51 is not visible in the image 81 of the environment. In this situation, simply superimposing the POIs related to the occluded objects on the top of the view of the real environment (as shown in FIG. 9) could confuse users in a way that the users may wrongly relate the POIs to a front object which is visible in the view. In the example of FIG. 9, the users may relate the POI information 93, 94, 95, 96, 97, and 98 to a real object (building) A, while 97 and 98 that represent POI_7 and POI_8 are not related to the building A.

Therefore, it would be desirable to visualize the POIs related to the occluded objects in a different way from the visible front objects and more particularly in a way that the users could intuitively perceive the occlusion effect. For example, the POIs related to the occluded objects may be shown semi-transparent, or in dash lines, while the POIs related to the front objects could be shown opaquely, in solid lines, or in a different color.

Meier et al. in reference [3] teach to use the depth along the view direction of a POI from the view point to the real environment in order to determine whether to display the POI in an occlusion model or not. If the POI has a longer view distance than the depth, the POI is displayed in an occlusion way, i.e. semi-transparent, or in dash lines, according to reference [3].

SUMMARY OF THE INVENTION

A real object of the real environment often occupies a three-dimensional space which is a volume in 3D space, while a POI related to the real object represents a location which is a point in 3D space. The POI location could be assigned anywhere within the real object that the POI is related to. Therefore, the real object could be visible from the view point, while the POI has a longer view distance than the estimated depth along the view direction to the real object. For instance, a building (e.g. a shopping mall) is visible in a view of the real environment, while the view distance of a POI related to the building is longer than the depth from the view point to the exterior surface (e.g. wall) of the building.

In FIGS. 5, 6, 7, and 8, there is depicted an example where the real object A is visible in the image 81, while POI_3 that is related to A (FIG. 7) is further away than A with respect to the viewing point 71. In this case, the method disclosed by Meier et al. in reference [3] will result in an improper occlusion perception of overlaying the POI to the view of the real environment.

A general problem in the space of Augmented Reality is that it is very easy for people to build mock-ups or visionary movies of a nice looking Augmented Reality experience, but the detailed problems in order to achieve such an experience are not considered and not solved.

The situation that a POI represents a real object that is located inside another real object could be more challenging for properly displaying the POI in an augmented reality system. For example, POI_4 represents a real object (room) A3 that is inside the building A in the real environment 51 (FIG. 7). When a user stands outside of the building A and uses the augmented reality technology to overlay the POI_4 to an image of the real environment 51, it is preferred to display POI_4 information in a non-occlusion model, i.e. it is displayed in the image. In another case, the building D is outside of the building A and is occluded by A in the image 81 (FIG. 7, 8). In this case, it is preferred to overlay POI_8 related to D on the image 81 in an occlusion model, i.e. it is not displayed in the image. None of the previously developed methods teach or motivate displaying POI_8 in an occlusion model, but POI_4 in a non-occlusion model.

It would therefore be beneficial to provide a method for representing virtual information in a real environment which is capable to improve occlusion perception when blending in items of virtual information, particularly to the view of a real environment in augmented reality applications or systems.

According to an aspect of the invention, there is provided a method for representing virtual information in a view of a real environment, comprises the following steps: providing a system setup comprising at least one display device, wherein the system setup is adapted for blending in virtual information on the display device, determining a position of a viewing point relative to at least one component of the real environment, providing a geometry model of the real environment, the geometry model comprising multiple representations of respective built-in real objects of the real environment, each representation comprising at least one 2D or 3D geometrical shape having at least one boundary delimiting the respective object, wherein one side of the boundary is delimiting the object toward its inner side and the other side of the boundary is delimiting the object toward its outer side, providing at least one item of virtual information and a position of the at least one item of virtual information, determining a visualization mode of blending in the at least one item of virtual information on the display device according to the position of the viewing point and the geometry model, calculating a ray between the viewing point and the item of virtual information, determining a number of boundary intersections by the ray, wherein if the number of boundary intersections is less than 2, the item of virtual information is blended in in a non-occlusion mode, otherwise in an occlusion mode, and/or the position of the item of virtual information is moved to the front of the intersected boundary with respect to the viewing point.

Particularly, the present invention addresses the problem of improper occlusion perception of blending in or overlaying the digital content or items of virtual information, such as points of interest (POIs), to a view of the real environment or a part of the real environment in augmented reality applications by using the position of the viewing point, and a geometry model of the real environment, preferably a 2D and/or 3D geometry model.

The digital content or items of virtual information can be any type of visually perceivable data such as objects, texts, drawings, videos, or their combination. The view of the real environment or a part of the real environment is captured by a capture device. For example, the view of the real environment could be captured as visual impressions by user's eyes or acquired as one or more images by a camera worn by a user or attached on a device held by a user. Another alternative display device could be a head-up display, e.g. installed in a car or an airplane. A human eye and a camera have the same imaging mathematical model, i.e. pinhole projection model. The pinhole projection model describes a relationship between the coordinates of a 3D point and its image projection onto the view. An image plane is the plane in which an image produced by an optical system is formed. The image projection of a 3D point is defined by the intersection between a ray from the view point to the 3D point and the image plane.

The overlaid or blended in information of the items of virtual information, e.g. POIs, and the real environment can be seen by the users in a well-known optical see-through display having semi-transparent glasses. The user then sees through the semi-transparent glasses objects of the real environment augmented with the virtual information of the POIs blended in in the glasses. The overlay of the POIs and the real environment can also be seen by the users in a video see-though display having a camera and a common display device. The real environment is captured by the camera and the overlay of the virtual data and the real environment is shown in the display to the users.

In an embodiment, the method includes determining a pose of a viewing point relative to at least one component of the real environment, which describes the position and orientation at which a capture device (e.g. a camera or a human eye) captures the view of the real environment or part of the real environment as an image or visual perception.

A real environment could be any real scene in real world, such as a nature scene, an indoor environment scene, or a city scene. A real environment includes one or more real objects. A real object, such as a place, a building, a tree, or a mountain, locates and occupies an area in the real environment. A place is an area located in real environment with boundaries or a portion of space which typically has a name in an area, such as an indoor area of a building, Munich, Manhattan, or English garden (a green area located in Munich). A real object could further contain one or more real environments that are within the containing real object. For example, a city (a real environment) includes a shopping mall (a real object in the city), and the shopping mall could contain an indoor scene (a real environment) that includes various stores (real objects in the shopping mall).

Particularly, the geometry model comprises multiple representations of built-in real objects each comprising at least one 2D or 3D geometrical shape having at least one boundary for delimiting the object, the method further including the steps of calculating a ray between the viewing point and the item of virtual information, and determining a number of boundary intersections by the ray. Particularly, if the number of boundary intersections is less than 2, the item of virtual information is blended in in the view in a non-occlusion mode, otherwise in an occlusion mode. According to an additional or alternative embodiment, if the number of boundary intersections is less than 2, the position of the item of virtual information is moved to the front of the intersected boundary with respect to the viewing point. One side of the boundary is delimiting the object toward one side, particularly its inner side, and the other side of the boundary is delimiting the object toward another side, particularly its outer side. For example, the boundary may be a line with one side of the line delimiting the object toward its inner side and the other side of the line delimiting the object toward its outer side. For instance, the line may represent a wall of a building. According to another example, a boundary may be defined by a set of lines, e.g. designating a wall having two sides (i.e., an inner and an outer side), e.g., represented by a line for one side of the wall and a line for the other side of the wall. In this example, the boundary should be understood as being formed by the set of two lines representing the wall as a boundary, wherein one side of the boundary (i.e. the inner side/line of the wall) is delimiting the object toward its inner side and the other side of the boundary (i.e. the outer side/line of the wall) is delimiting the object toward its outer side.

According to an embodiment, the criterion is determined at least in part based on shooting one or more rays from the viewing point to the built-in real object using the geometry model. If there exists at least one ray from the viewing point first intersecting with at least one boundary of the built-in real object, the built-in real object is at least partially visible in the view of the real environment.

According to an embodiment, the representation of the built-in real object comprises at least one 2D or 3D geometrical shape having at least one boundary for delimiting the object, the method further including the step of determining whether the position of the item of virtual information is inside the 2D or 3D geometrical shape and associating the item of virtual information with the built-in real object based thereon.

According to an embodiment, the method is performed iteratively, where in each iteration a height of the item of virtual information is increased and the iteration is stopped when the number of boundary intersections by the ray becomes less than 2 or when the height exceeds a predefined limit.

According to a further embodiment, the determination of the visualization mode of items of virtual information is influenced by the distance of the virtual information to the viewing point and in case the item of virtual information is determined to be blended in in a non-occlusion mode, a graphical representation of the item of virtual information is added to the geometry model and is considered when determining the visualization mode of a following item of virtual information.

For example, the geometry model is derived from a depth sensor source associated with the display device, such as a stereo-camera, an array camera or a time-of-flight camera.

In a further embodiment, the method comprises the step of providing multiple items of virtual information and relating each of the items of virtual information to a built-in real object which is at least partially visible in the view of the real environment, to a front scene group of the real environment or an occluded scene group of the real environment.

In a further embodiment, the method further comprises the steps of providing multiple items of virtual information and relating each of the items of virtual information to a built-in real object, to a front scene group of the real environment or an occluded scene group of the real environment and assigning the items of virtual information related to non-visible built-in objects to the occluded scene group.

In a particular implementation, the system setup is adapted for providing at least one view of the real environment by means of taking a picture and blending in virtual information on the display device such that the virtual information is superimposed with the real environment in at least part of the view.

According to an embodiment, the system setup is adapted for providing at least one rendered view of the real environment and blending in virtual information on the display device such that the virtual information is superimposed with the real environment in at least part of the view.

According to another embodiment, the system setup is adapted for providing at least one view of the real environment and blending in virtual information on a semi-transparent display device such that the virtual information is superimposed with the real environment in at least part of the view.

For example, the method further comprises the step of overlaying the items of virtual information that are related to visible built-in objects to the view of the real environment in a non-occlusion mode, the items of virtual information of the front scene group in a non-occlusion mode, and the items of virtual information of the occluded scene group in an occlusion mode.

The method may further comprise the step of re-assigning the items of virtual information of the front scene group to either the front scene group or the occluded scene group based on a depth map of the view of the real environment provided by at least one range sensor of the system setup.

According to an embodiment, the method further comprises the step of providing a depth map of the view of the real environment provided by at least one range sensor of the system setup, wherein the criterion is determined at least in part based on the depth map.

For example, the geometry model is a 2D model of a real environment which describes a 2D geometry of the real environment with respect to a particular plane, for example the ground plane of the 2D model. The geometry model is typically not displayed in the view, it is rather used for calculating and processing purposes as described herein. However, the geometry model may also be displayed in the view, if so desired.

The geometry model may describe at least one of the following attributes of the real environment: shape, symmetry, geometrical size, structure. The geometry model may be representative of a city map, a city blueprint, a floor plan of a building, or a blueprint of a shopping mall.

According to another embodiment, the geometry model is a 3D model of a real environment which describes a 3D geometry of the real environment. For example, the 3D model of the real environment is obtained from a 2D model and a dimension orthogonal to a ground plane of the 2D model.

Preferably, in the geometry model the built-in real objects of the real environment refer to real objects represented by at least one of 2D and 3D geometrical shapes having at least one closed boundary, such as at least one edge or surface, in the geometry model.

According to an embodiment, items of virtual information related to occluded real objects in the view of the real environment are shown semi-transparent, or in dash lines, and items of virtual information related to at least partially visible real objects in the view of the real environment are shown opaquely, in solid lines, or in a different color.

The invention also relates to a computer program product adapted to be loaded into the internal memory of a digital computer system, and comprising software code sections by means of which the steps according to any of the above aspects and embodiments are performed when said product is running on said computer system.

BRIEF DESCRIPTION OF THE DRAWINGS

Further aspects, advantageous features and embodiments of the invention will be evident from the following description in connection with the drawings, in which:

FIG. 2A shows a flowchart of an embodiment of determining visible built-in objects using a 2D model of the real environment, FIG. 2B shows a flowchart of another embodiment of determining visible built-in objects using a 3D model of the real environment, FIG. 14 shows an exemplary image of the real environment acquired at the viewing point with the field of view as shown in FIG. 13.

DETAILED DESCRIPTION OF THE INVENTION

Figure 1:
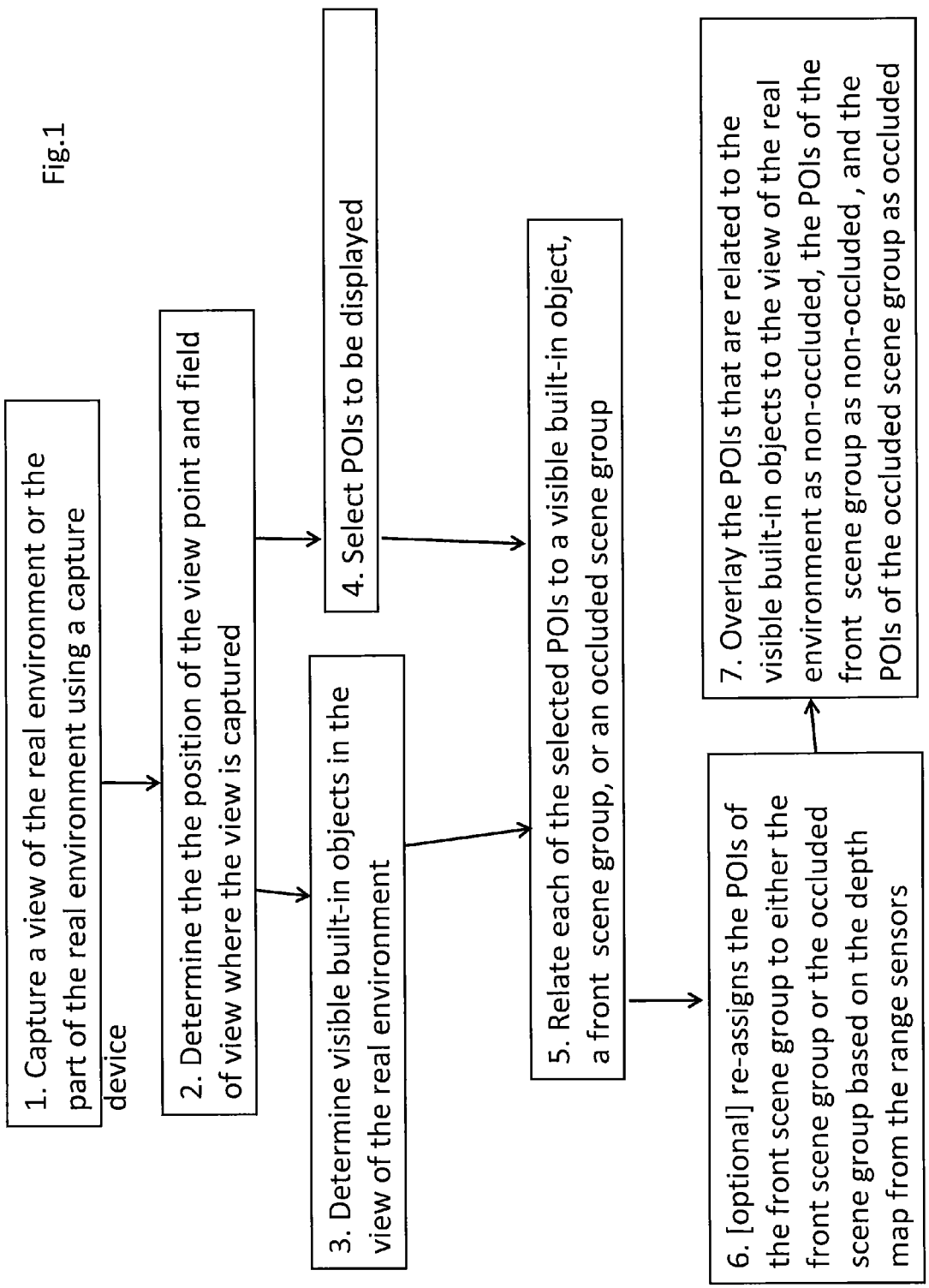
FIG. 1 shows a flowchart of an embodiment of a method according to the invention overlaying POIs to a view of the real environment in an augmented reality application.

An embodiment of the invention is shown in FIG. 1 as a flowchart illustrating a first embodiment of a method according to the invention overlaying items of virtual information, such as POIs, to a view of the real environment in an augmented reality application.

Figure 7:
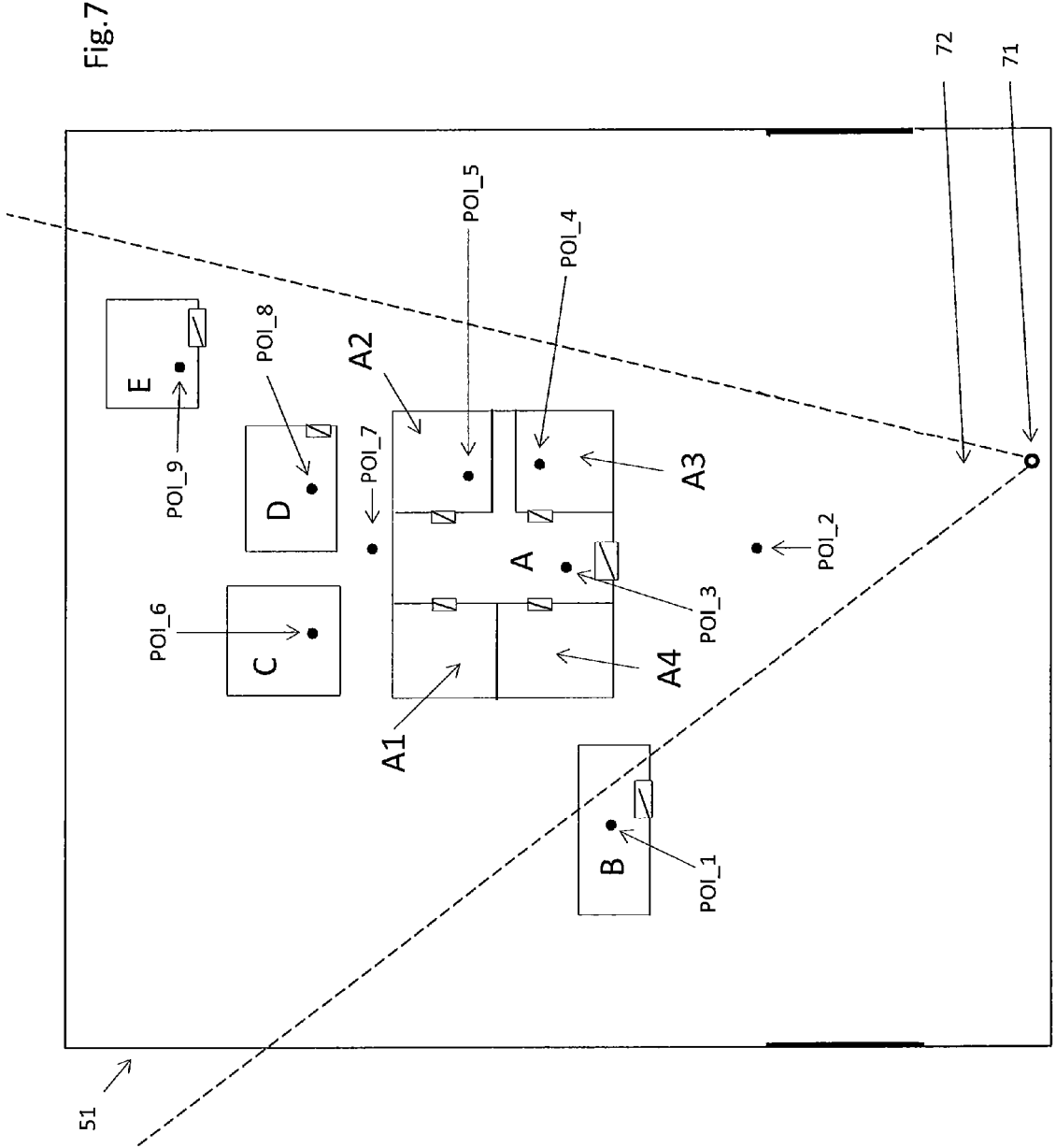
FIG. 7 shows the scene of FIG. 6 from a perspective of a viewing point with a field of view, and the locations of POIs (POI_1, POI_2, POI_3, POI_4, POI_5, POI_6, POI_7, POI_8, and POI_9) with respect to the real environment.

In step 1, a capture device, particularly a camera, captures a view of the real environment or a part of the real environment. For example, the view could be captured as visual impressions by user's eyes and/or be acquired as one or more images by a camera worn by a user or attached on a device held by a user. In this embodiment, the captured view may be used for determining the pose of the viewing point 71, as shown in FIG. 7.

In step 2, the position and orientation (pose) of the viewing point 71 and the field of view 72 where the capture device captures the view of the real environment are determined. The position and orientation of the viewing point and the field of view should be determined with respect to the real environment. Global positioning system (GPS) could be employed to determine the global location of the capture device, e.g. a geo-coordinate such as a 2D coordinate of longitude and latitude, or a 3D coordinate of longitude, latitude and altitude. Various orientation sensors, such as compass and gravity sensors, can measure the orientation with respect to the global coordinate system. 2D or 3D geometry models of the real environment are also represented in the global coordinate system. Having this information, the position and orientation of the viewing point with respect to the real environment could be determined. Various vision-based pose estimation methods could be used to estimate the position and orientation of the viewing point, e.g. based on 2D or 3D model geometry of the real environment. The viewing orientation together with the angle coverage of the view defines the field of view, in which the real environment would be viewed.

The position of the viewing pose, i.e. the viewing point, could be a geographical location or a location with respect to a reference coordinate system. The geographical location could be described by 2D coordinates of longitude and latitude, or 3D coordinates of longitude, latitude and altitude. The 2D coordinates of longitude and latitude are sufficient to determine the position of the viewing pose in many situations, such as the users or camera devices are known to stand on the ground level in the real environment.

The orientation of the viewing pose, i.e. the viewing point, describes angular position or attitude of the view direction with respect to a reference coordinate system. The viewing orientation together with the angle coverage of the view defines the field of the view, in which the real environment would be viewed.

With the knowledge of the position and orientation of the viewing point and with using a geometry model, such as a 2D and/or 3D geometry model of the real environment, an aspect of the invention is to determine or check a number of crossings or intersections of boundaries of built-in objects in the geometry model by a ray between the location of the view point and a respective POI, as set out in more detail below.

As described herein, built-in real objects of a real environment refer to real objects represented by 2D and/or 3D geometrical shapes having at least one boundary, particularly closed boundary, such as edges, surfaces, and/or walls, in the 2D and 3D model of the real environment, respectively, for delimiting the object. The 2D and/or 3D geometrical shapes may be defined by any mathematical representation describing edges and surfaces, such as polygons, circle, or closed B-spline for 2D geometry and polyhedrons, sphere, cylinder for 3D geometry.

The tem' "boundary" should be understood herein in that one side of the boundary is delimiting the object toward one side, such as its inner side, and the other side of the boundary is delimiting the object toward its other side, such as its outer side. For example, the boundary may be a line with one side of the line delimiting the object toward its inner side, i.e. the inside of a closed or nearly closed object such as a building, and the other side of the line delimiting the object toward its outer side, such as the outside of a building. For instance, the line may represent a wall of a building. According to another example, a boundary may be defined by a wall having two sides (i.e., an inner and an outer side), e.g., represented by a line for the inner side of the wall and a line for the outer side of the wall. In this example, the boundary should be understood as being formed by the set of two lines representing the wall as a boundary, wherein one side of the boundary (i.e. the inner side/line of the wall) is delimiting the object toward its inner side and the other side of the boundary (i.e. the outer side/line of the wall) is delimiting the object toward its outer side. If an object is not delimited by a closed hull, such as a building, but has an open shape (such as a wall), the inner side of the object should be understood as being the side of the boundary facing away from the viewing point and the outer side of the object should be understood as being the side of the boundary facing toward the viewing point.

A building or a road is normally a built-in real object of a city, as the building or the road is represented by a polygon in the 2D city map. A room could be a built-in real object of an indoor scene, as the room is represented by a polygon in the 2D blueprint of the indoor scene. A human or a moving car is often not a built-in real object, as they are not described as the part of a real environment in the 2D or 3D model of the real environment.

According to an aspect of the present invention it is determined which built-in real objects in the real environment should be visible or partially visible in the view of the real environment. This could be achieved by using the position and orientation of the viewing pose and 2D and/or 3D geometry model of the real environment. A more realistic result regarding the visible built-in real objects could be obtained by taking a depth map of the view of the real environment from range sensors into account, which is optional and described in more detail below. An aspect of the invention further discloses a way to determine whether a POI should be displayed in a occlusion mode or in a non-occlusion mode. This is achieved by relating the respective POI to built-in real objects based on the number of crossing or intersecting boundaries, as described in more detail below.

Particularly, a 2D model of a real environment describes a 2D geometry of the real environment with respect to a particular plane. Geometry describes the following attributes, but not limited to, shape, symmetry, geometrical size, and structure. The particular plane described by the 2D model may refer to the ground plane of the 2D model.

The 2D model of a real environment could be a city map, a city blueprint, a floor plan of a building, or a blueprint of a shopping mall. A city map or blueprint typically describes a 2D geometry of the city with respect to the earth plane. The floor plan of the building may be used as the 2D geometry or structure of the building on a particular floor. The earth plane and the floor plane are used herein as the ground planes for the 2D city map and the 2D floor plan, respectively.

Particularly a 3D model of a real environment describes a 3D geometry of the real environment and the real objects of the real environment. The 3D model of the environment could be obtained from the 2D model and a dimension orthogonal to the ground plane of the 2D model. A 3D model of a city could be constructed from the city blueprint, and the corresponding height data. The 3D model could also be a terrain which is the vertical and horizontal dimension of the environment surface.

Figure 12:
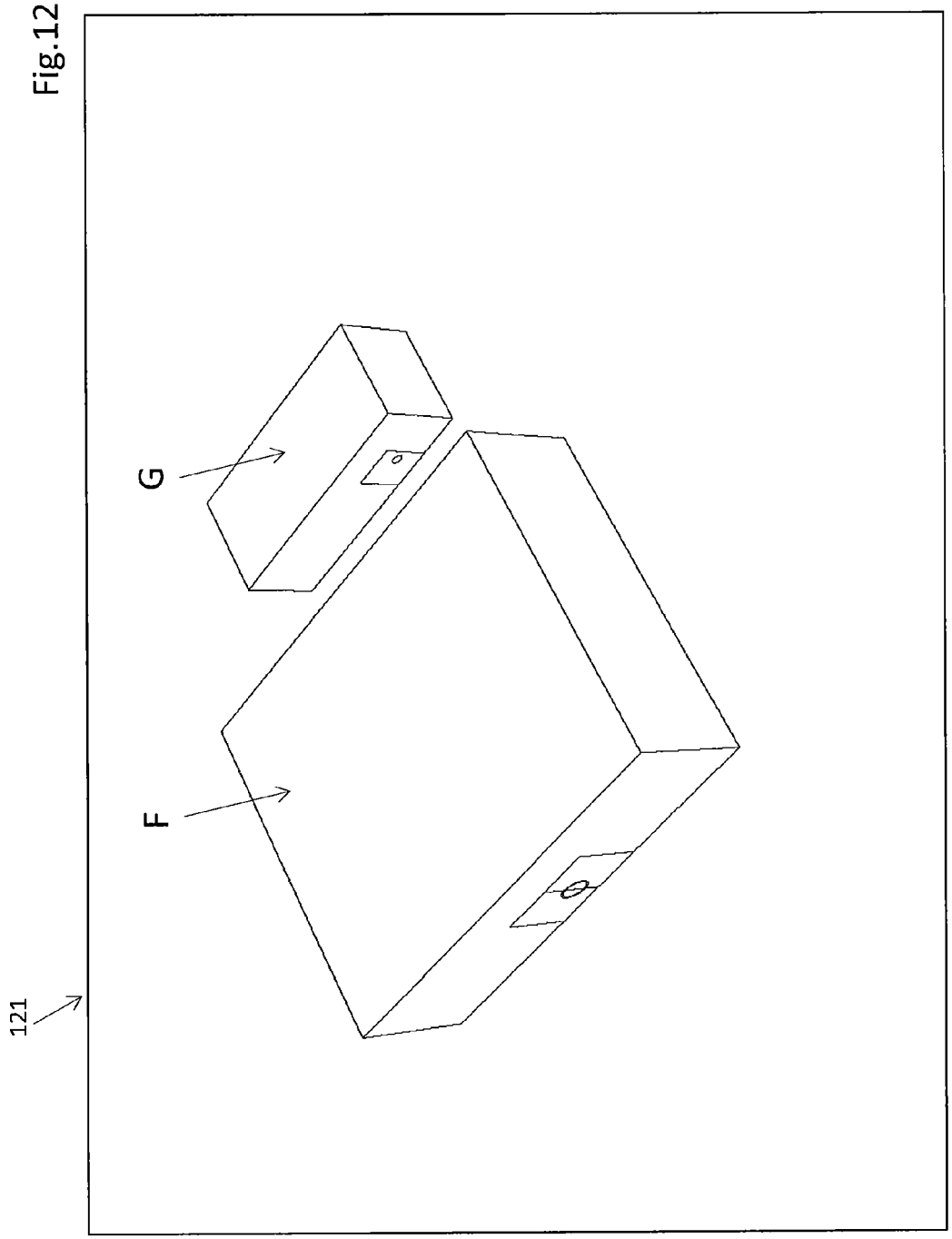
FIG. 12 shows an exemplary real environment that includes real objects in the form of buildings F and G.
Figure 13:
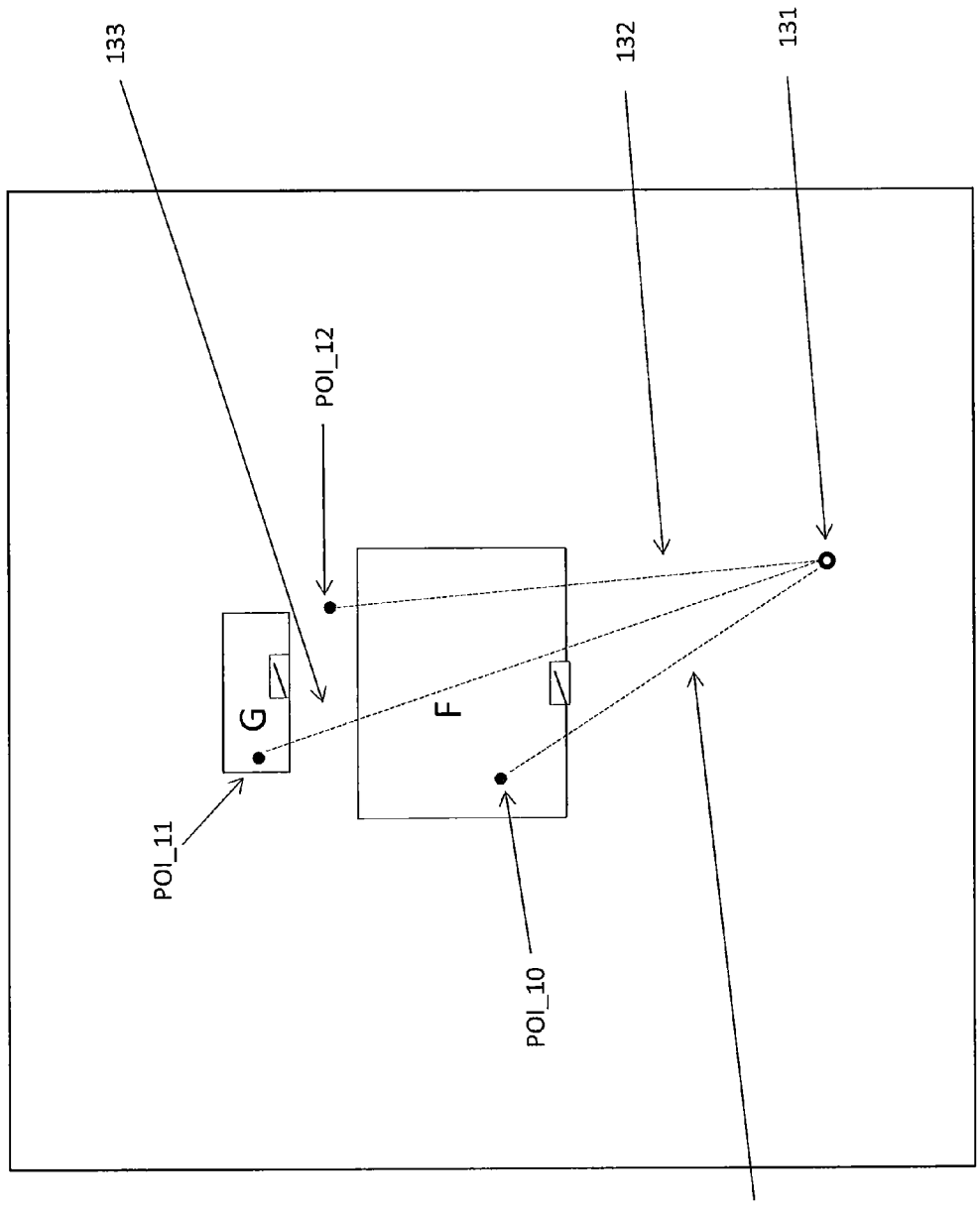
FIG. 13 shows an exemplary blueprint of the real environment according to FIG. 12, with a viewing point and the locations of POIs (POI_10, POI_11, and POI_12) with respect to the real environment.

FIG. 12 shows an exemplary real environment that includes real objects in the form of buildings F and G, and FIG. 13 shows an exemplary blueprint of the real environment 121 according to FIG. 12, with a viewing point 131 and the locations of items of virtual information (here POIs), particularly POI_10, POI_11, and POI_12 with respect to the real environment. FIG. 14 shows an exemplary image 141 of the real environment acquired at the viewing point with the field of view as shown in FIG. 13.

When a POI locates inside a built-in real object that is visible in a view of a real environment, there most probably exists one boundary of a built-in real object between the associated POI and the viewing point (see, e.g., FIG. 13 with viewing point 131 and POI_10 for building F as built-in real object in a real environment 121, the boundary being the front wall of building F with respect to a view 141 captured at the viewing point 131). Therefore, if the number of crossed (or intersected) boundaries is less than 2, the POI should be overlaid to the view in a non-occlusion mode, otherwise in an occlusion mode. A ray 134 between the viewing point 131 and POI_10 crosses 1 boundary. POI_10 is overlaid to the view 141 in a non-occlusion mode, e.g. solid lines (see FIG. 14). A ray 132 between the viewing point 131 and POI_12 crosses 2 boundaries. POI_12 is overlaid to the view 141 in an occlusion mode, e.g. dash lines (see FIG. 14). The same happens with POI_11 (see FIG. 14) as the ray 133 crosses 3 boundaries.

It is also possible to move the locations of POIs that cross less than 2 boundaries of the respective built-in real object to the front of the respective crossed boundaries with respect to the viewing point. Then, POIs located closer to the viewing point compared to corresponding depth data (e.g. from range sensors) will be displayed in the non-occlusion mode, and POIs located further away from the viewing point compared to corresponding depth data will be displayed in the occlusion mode. This could work for all the cases as long as the crossed boundaries are visible in a view of the real environment without re-computing the number of crossing boundaries.

Now returning to the process of FIG. 1, step 3 determines visible built-in real objects in the view of the real environment. A visible built-in real object is a built-in real object (or, as also simply called herein, built-in object) that is visible or partially visible in the view of the real environment. Partially visible means at least part of the built-in object is visible in the view. An aspect of the present invention discloses a method to determine which built-in objects in the real environment should be visible or partially visible in a view of the real environment. This could be achieved by using the position and orientation of the viewing pose, and 2D and/or 3D geometry model of the real environment. A more realistic result of determining the visible built-in objects could be obtained by taking a depth map of the view of the real environment from range sensors into account.

The 2D locations of the viewing point and the POI and the 2D model of the real environment are sufficient to determine visible built-in objects in many situations. One example is the situation that the viewing point and built-in objects within the field of view are on the same distance level to the ground plane of the real environment. For instance, the capture device stands on the earth plane where all buildings and landmarks are located on the same earth plane in the real environment of a city. Another example is a situation in which built-in objects within the field of view are on the same distance level to the ground plane of the real environment, and the built-in objects have the same height to the ground plane or the heights do not influence the visibility of the built-in objects in the view. For instance, all the stores inside a shopping mall may have the same height and the height will not influence the visibility of the stores in a view captured by a capture device inside the shopping mall.

An embodiment of determining visible built-in objects according to step 3 of FIG. 1 using a 2D model of the real environment is shown in FIG. 2A. Step 3.1A provides a 2D model of the real environment. Step 3.2A determines visible built-in objects according to shooting rays from the viewing point within the field of view on the 2D plane of the 2D model. A built-in object is visible in the view if at least a part of the built-in object is first intersecting with a ray from the viewing point. The intersection coordinates could be computed based on the equation of the ray from the viewing point and the equation of the 2D geometry model of the built-in object. Furthermore, step 3.2A computes the part of the view area each visible built-in object covers. For example, the view area a visible built-in object covers may be an image area of the visible built-in object in an image captured at the view of the real environment. The part of the view area a visible built-in object covers may be determined based on the intersections between the image plane and the corresponding rays or the part of the corresponding rays that determine the visible built-in object in the view. The part of the view area a visible built-in object covers may also be determined based on projecting the geometrical shape of the visible built-in object or the part of the geometrical shape onto the image plane with the knowledge of the position and orientation of the viewing point relative to the real environment.

In step 3.3A, a check is performed whether a depth map from one or more range sensors (e.g., a time of flight camera) exists for the view of the real environment. A depth map is a set of depth data measured by one or more range sensors which measure distances (i.e. the depths) from the viewing point to the real environment or the part of the real environment. If a depth map from range sensors is not available, the process is finished. If a depth map from one or more range sensors is available from step 3.3A, step 3.4A is then performed.

The real environment often contains real objects, such as moving cars and/or humans that do not exist in the 2D model of the real environment. Using a depth map from range sensors could provide a more realistic result of determining the visible built-in objects, as the range sensors measure the distances from the viewing point to the real environment.

In step 3.4A, the visibility of the visible built-in objects determined in step 3.3A may be re-determined according to a depth map. For each visible built-in object from step 3.3A, create artificial heights such that the artificial heights at least cover the orthogonal dimension to the ground plane in the field of view. Then, a 3D model of the visible built-in objects could be reconstructed from the artificial heights and their 2D model. Compare the 3D model with the corresponding depth from the depth data. If at least a part of the 3D model is not further away from the viewing point compared to the corresponding depth, the built-in object is visible in the view, otherwise not visible. Note that, a depth data of the depth map may indicate that there is no built-in object, like toward sky. Thus, a depth beyond a certain threshold may be set as zero depth before re-determining the visible built-in objects in step 3.4A.

In the next step 3.5A, the intersections between the image plane and the corresponding rays that re-determine a visible built-in object according to the depth map may re-define at least the part of the view area the visible built-in object covers.

An embodiment of determining a visible built-in object using a 3D model of the real environment according to step 3 of FIG. 1 is shown in FIG. 2B. Step 3.1B provides a 3D model of the real environment, in which a built-in object of the real environment may be represented by a polyhedron. The 3D model of the environment could be obtained from a 2D model and the dimension orthogonal to the ground plane of the 2D model. A 3D model of a city could be constructed from the city blueprint, and the corresponding height data. In a next step 3.2B, it is checked whether a depth map from range sensors (e.g. time of flight camera) exists for the view of the real environment. If a depth map from range sensors is not available, step 3.3B is performed.

In step 3.3B, a depth map for the view of the real environment is generated based on the pose of the viewing point and the 3D model of the real environment. This could be achieved by using a ray casting method or so-called rasterization method. The basic concept of the ray casting is to emit a number of rays from the viewing point in 3D space and detect the first intersections of the rays with the surface defined by the 3D model. At the process of the ray casting, a visible built-in object is determined by at least the part of the built-in object first intersecting with a ray from the viewing point.

If a depth map from range sensors is available from step 3.2B, step 3.4B is then performed. In step 3.4B, a built-in object is visible in the view if at least part of the object is not further away along a ray from the viewing point compared to the corresponding depth in the depth map.

In the next step 3.5B, it computes the part of the view area each visible built-in object covers. The part of the view area a visible built-in object covers may be determined based on the intersections between the image plane and the corresponding rays or the part of the corresponding rays that determine the visible built-in object in the view. The part of the view area a visible built-in object covers may also be determined based on projecting the geometrical shape of the visible built-in object or the part of the geometrical shape onto the image plane with known with the knowledge of the position and orientation of the viewing point relative to the real environment.

Figure 5:
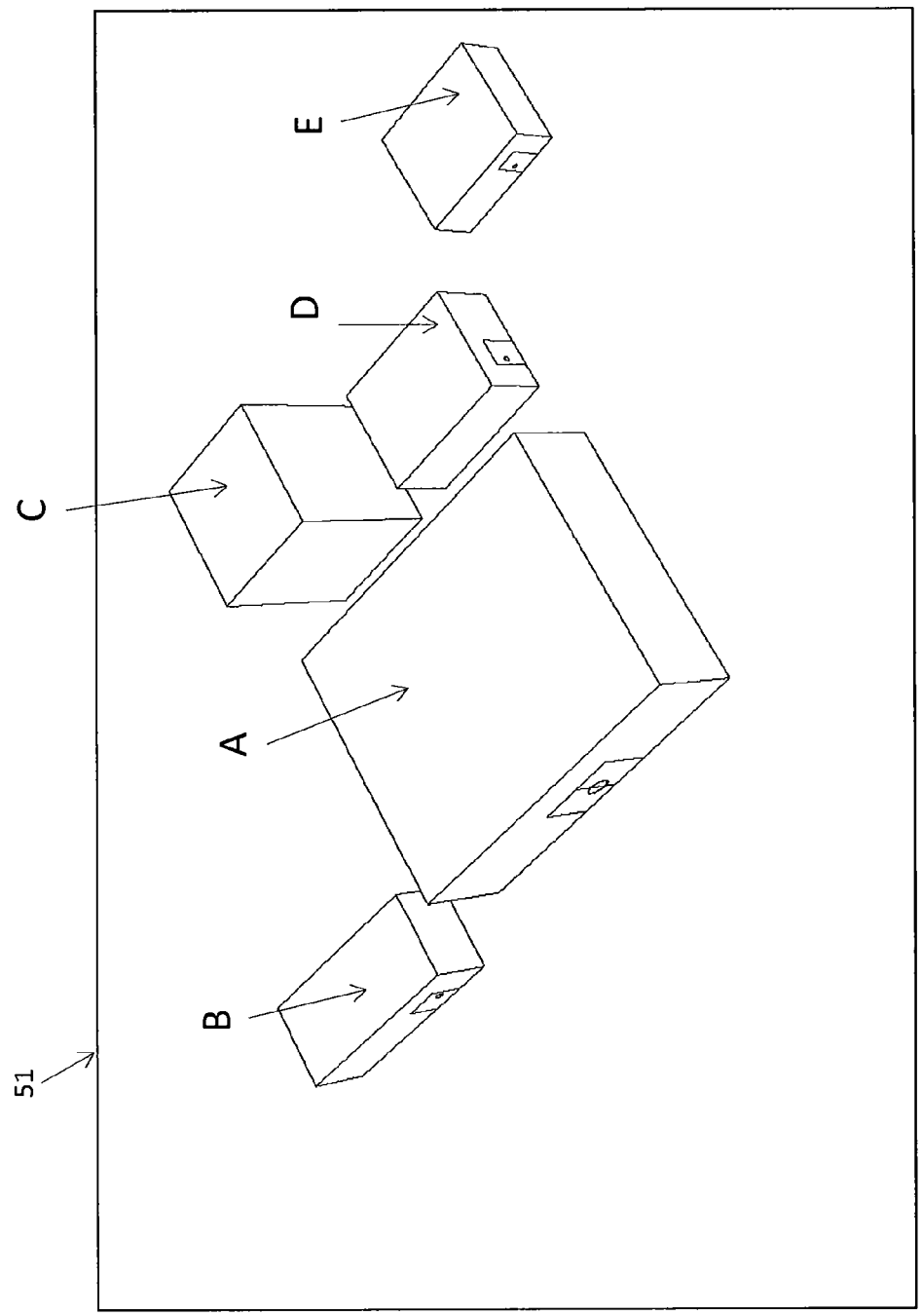
FIG. 5 shows an exemplary real environment that includes real objects in the form of buildings A, B, C, D and E.
Figure 6:
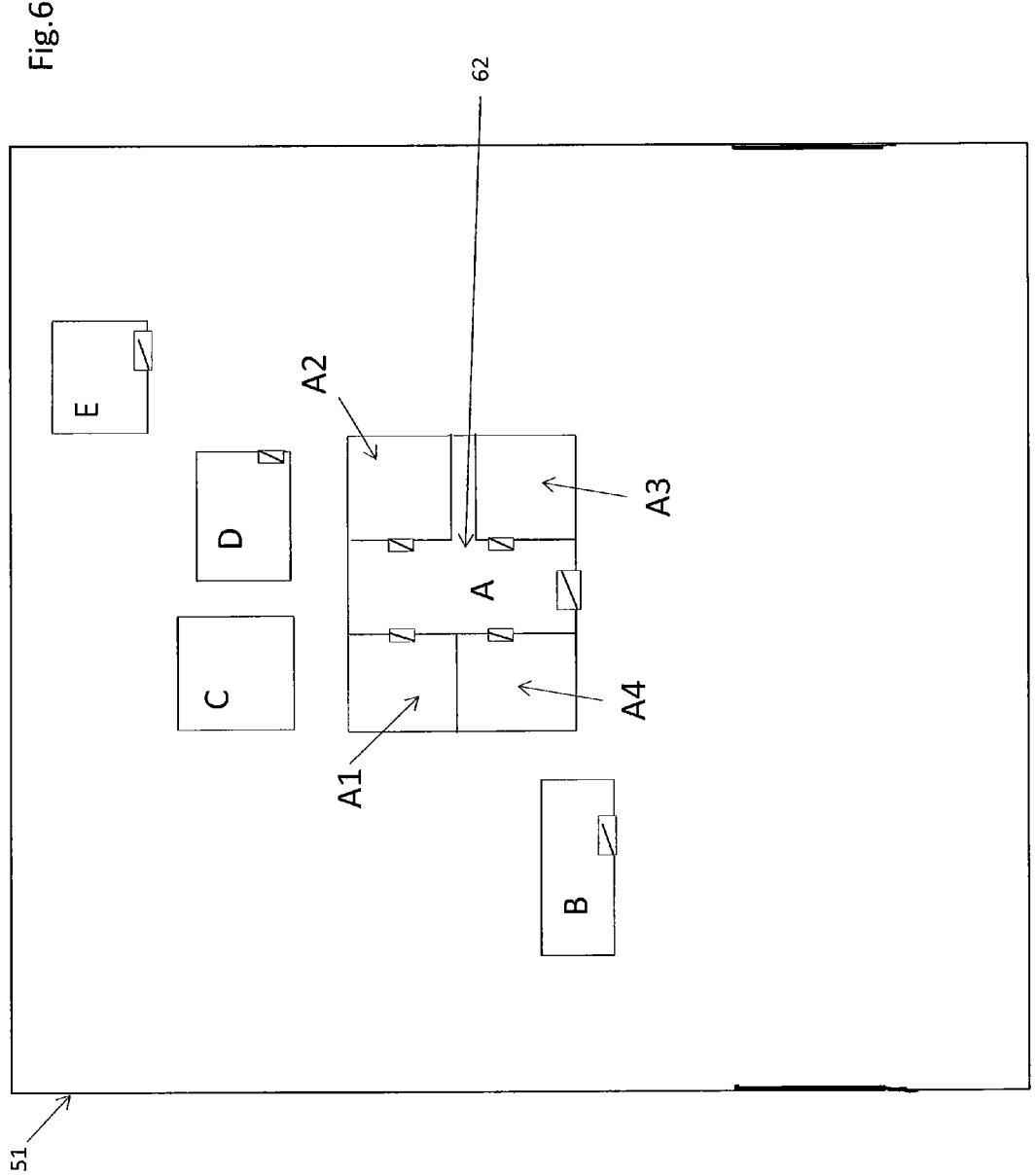
FIG. 6 shows an exemplary blueprint of the real environment according to FIG. 5, with building A further containing a real environment 62 that includes real objects A1, A2, A3, and A4.
Figure 8:
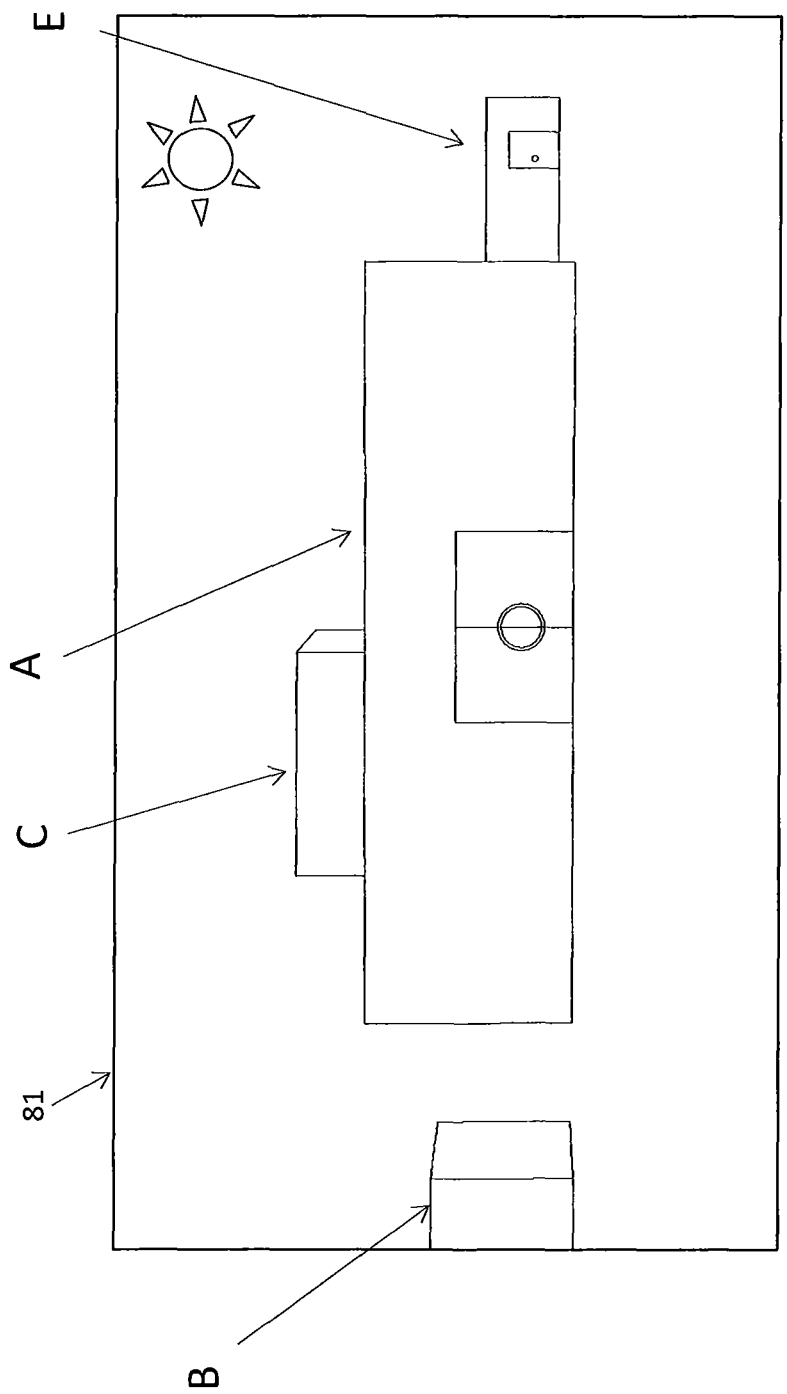
FIG. 8 shows an exemplary image of the real environment acquired at the viewing point with the field of view as shown in FIG. 7.
Figure 9:
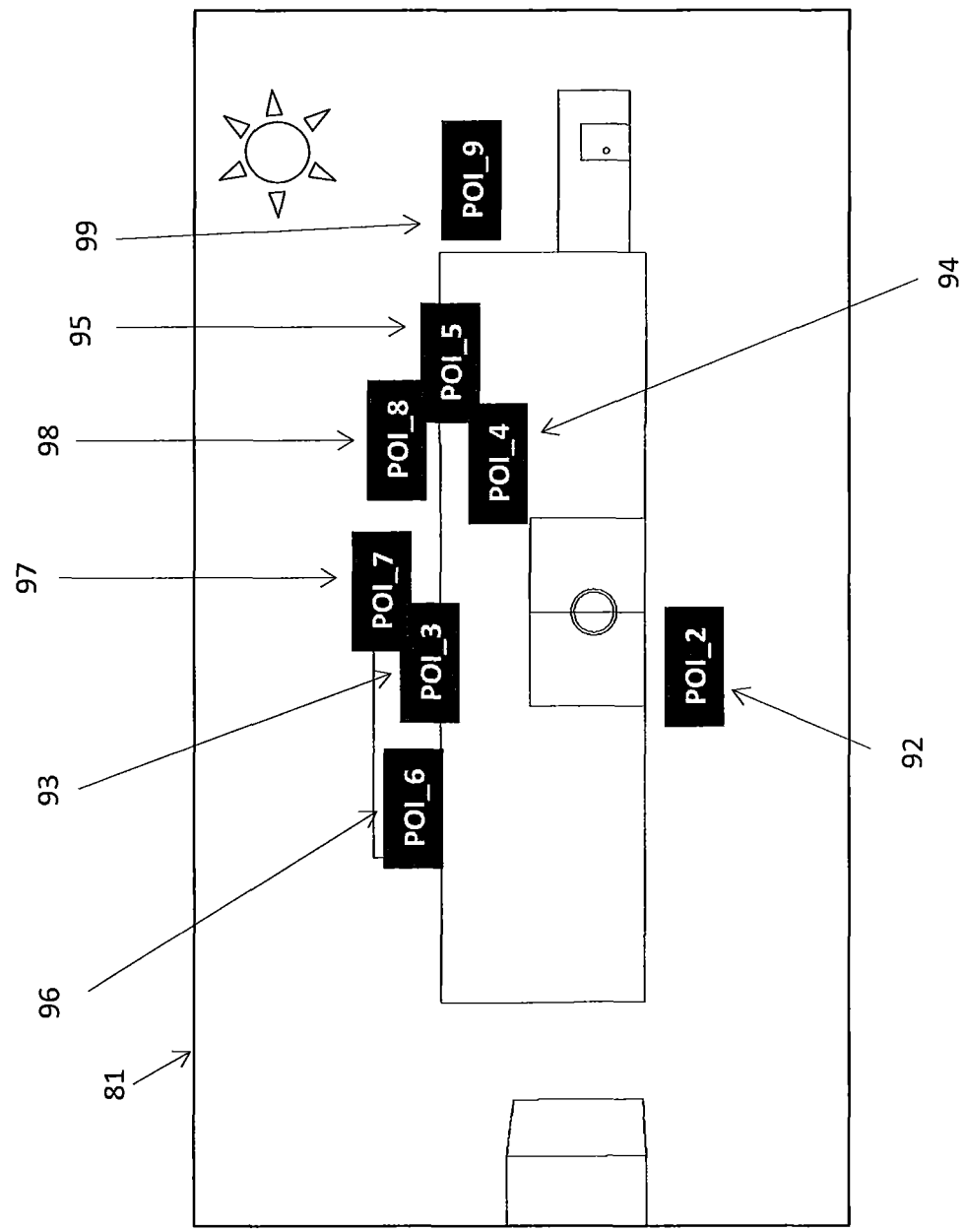
FIG. 9 shows the scene of FIG. 8 in which POIs are opaquely overlaid to the image.

FIG. 5 shows a real environment 51 that includes built-in objects A, B, C, D and E. Built-in object A further contains a real environment (indoor environment) 62 that includes built-in objects A1, A2, A3, and A4 (FIG. 6). A view of the real environment 51 that is captured at the viewing point 71 with field of view 72 is shown as an image 81 in FIG. 8. Based on the disclosed method of determining visible built-in objects in the view of the real environment using a 3D model, A, B, C and E are visible built-in objects in the view 81.

Again referring to FIG. 1, step 4 selects the POIs to be displayed, overlaid or blended in in the view of the real environment. A point of interest (POI) includes a location and digital content that is related to a built-in real object in the real environment. The location of the POI can be anywhere but within the related built-in real object.

Basically, a POI could come from various sources and set up for a large variety of different forms of information as disclosed by Meier et al. in reference [3]. It is possible to automatically extract POI information from the Internet. For example, this may be company or restaurant websites with addresses or pages giving ratings. Users can deposit texts, images or 3D objects at locations and make the same available to others. Information pages, such as Wikipedia, can be searched for geo-information, and the pages can be made accessible as POI. POIs can be generated automatically from the search and browsing behavior of the users of mobile devices. It is possible to show other locations of interest, such as underground transportation or bus stations, hospitals, police stations, physicians, real estate ads or fitness clubs.

The POIs to be overlaid or blended in in the view of the real environment could be chosen or selected based on different criteria, e.g. distance from the view point, along a line of sight from the view point, and/or within the field of view.

Step 5 of FIG. 1 relates each of the selected POIs to a visible built-in object, a front scene group, or an occluded scene group. In a front scene group, POIs are shown in non-occlusion mode, whereas in an occluded scene group POIs are treated to be shown in an occlusion mode (e.g., not shown at all or shown in dashed lines, etc., as set out in more detail herein).

The 2D locations of the viewing point and the POI, and the 2D geometry model of the real environment are sufficient to relate each of the selected POIs to a visible built-in object or to an unrelated group. One example is the situation that the viewing point and built-in objects within the field of view are on the same distance level to the ground plane of the real environment. For instance, the capture device stands on the earth plane where all buildings and landmarks are located on the same earth plane in the real environment of a city. Another example is a situation in which built-in objects within the field of view are on the same distance level to the ground plane of the real environment, and the built-in objects have the same height to the ground plane or the heights do not influence the visibility of the built-in objects in the view. For instance, all the stores inside a shopping mall may have the same height and the height will not influence the visibility of the stores in a view of the indoor scene of the shopping mall.

Relating a POI to a visible built-in object, a front scene group, or an occluded scene group could be based on testing whether a point of virtual information (i.e. POI) is inside a 2D or 3D geometrical shape of the built-in object. There could be used several methods for testing whether a point is inside a 2D or 3D geometrical shape, particularly such as point-in-polygon test (see references [7,8]) or point-in-polyhedron test (see reference [9]). In an aspect of the present invention there is proposed a test of whether a POI is located inside a built-in object. It is realized by crossing boundaries (e.g., edges and surfaces for 2D and 3D geometrical shapes, respectively) based on a ray from the POI to the view point. Such ray casting based approach could test whether a point locates inside a 2D (or 3D) geometry by checking how many times a ray, starting from the point and going an arbitrary direction, intersects edges (or surfaces) of the 2D (or 3D) geometry. The number of intersections is an even number if the point is outside, and it is odd if inside. It is known that the view point is outside of all visible built-in objects (the 2D or 3D geometries have to be tested). Therefore, the test could start along the ray from the POI until it reaches the viewing point.

There is another proposed test of whether an item of virtual information (e.g., a POI) is located inside a built-in object, or not. For example, it may be used an angle summation method for testing a point in a 2D polygon proposed in reference [7]. The angle summation method may be implemented as: sum the signed angles formed at the point by each edge's endpoints. One signed angle is formed by the point by subtending the two endpoints of one edge. If the sum is zero, the point is outside; if not, it's inside. The angle summation method could be applied to any 2D geometry that could be approximated by a polygon. The angle summation method could also be applied to test whether a point is inside a 3D geometry shape by forming 2D geometry shapes crossing the point and the 3D geometry shape. If there exists one crossing 2D geometry shape where the point is not inside, the point is outside the 3D geometry shape, otherwise, the point is inside the 3D geometry shape.

Figure 3A:
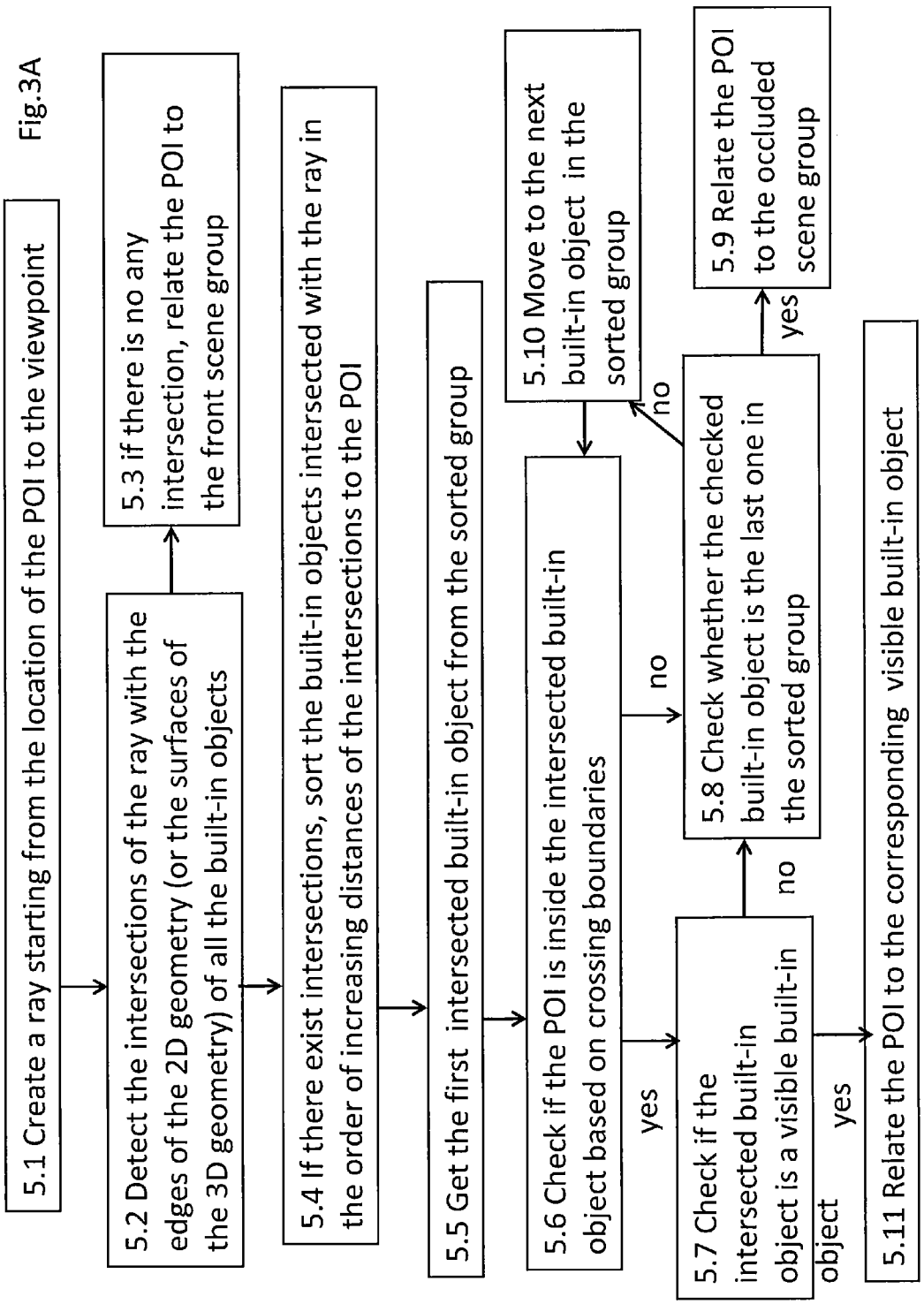
FIG. 3A shows a flowchart of an embodiment of relating a POI to a visible built-in object, a front scene group, or an occluded scene group.

A potential implementation of relating a POI to a visible built-in object or to an unrelated group is described by a flow chart shown in FIG. 3A as an embodiment for implementing step 5 of FIG. 1.

Step 5.1 creates a ray starting from the location of the POI to the viewing point. Step 5.2 detects the intersections of the ray with boundaries (e.g., edges or surfaces) of built-in objects, preferably all built-in objects. If there is no any intersection, relate the POI to the front scene group (step 5.3). If there exist intersections, sort the built-in objects intersected with the ray in the order of increasing distances of the intersections to the POI (step 5.4). Step 5.5 gets the first intersected built-in object from the sorted group. Step 5.6 checks if the POI is inside the intersected built-in object based on crossed boundaries. If yes, check if the intersected built-in object is a visible built-in object (step 5.7). If yes, relate the POI to the corresponding visible built-in object (step 5.11). If no, resulted from steps 5.6 and 5.7, step 5.8 checks whether the checked intersected built-in object is the last one in the sorted group. If it is the last one, relate the POI to the occluded scene group (step 5.9). Otherwise, move to the next one in the sorted group (step 5.10).

Returning to FIG. 1, step 6 that is optional re-assigns the POIs of the front scene group to either the front scene group or the occluded scene group based on a depth map provided from one or more range sensors. This could produce a more realistic result for the front scene group and the occluded scene group based on the realistic depth data of the real environment containing, e.g., cars and/or humans. The cars or humans that do not exist in the 2D or 3D model of the environment may be in the front and occlude the POIs with respect to the viewing point. If the distance from the POI to the viewing point is longer than the corresponding depth along the ray from the POI to the viewing point in the depth map, the POI is associated to the occluded scene group, otherwise to the front scene group.

Figure 10:
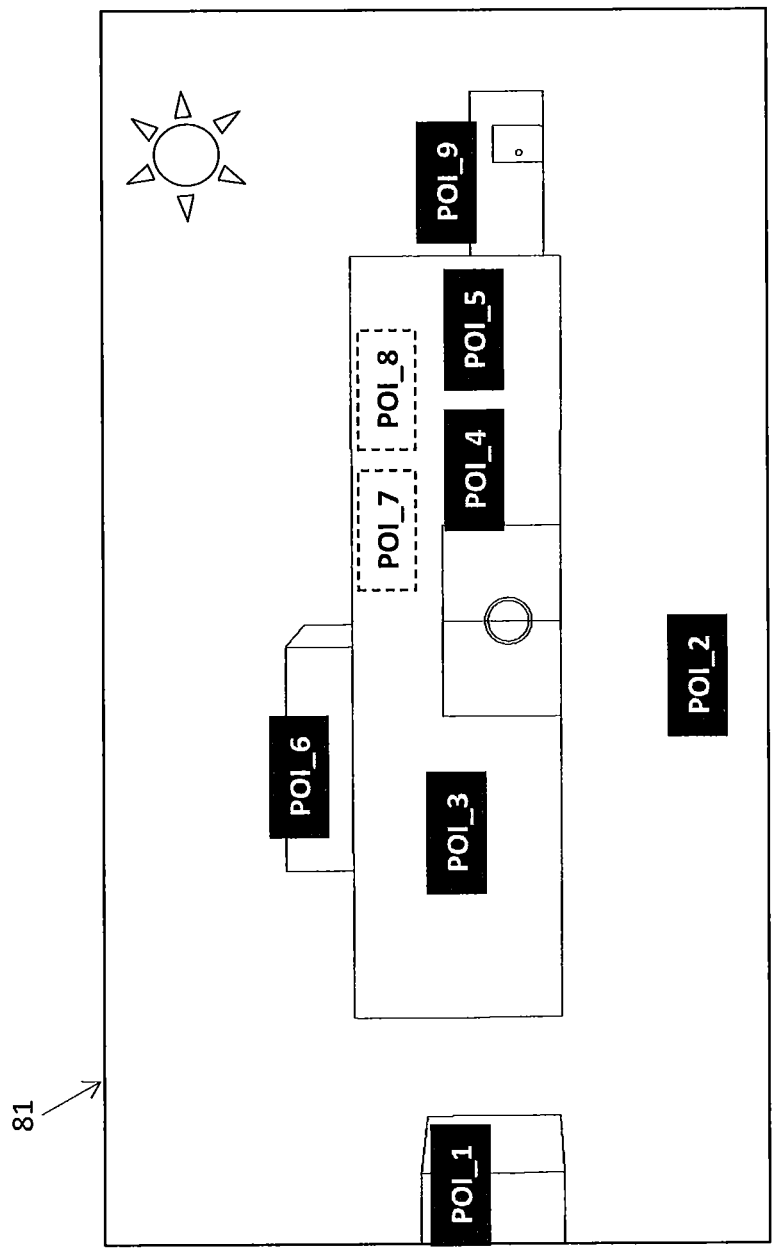
FIG. 10 shows an embodiment of a proper occlusion perception of overlaying POIs to the image of the scene of FIG. 8 according to an embodiment of the invention.

Based on the disclosed method of relating the POIs to a visible built-in object, a front scene group, or an occluded scene group using the 2D model, as shown in FIG. 10 the front scene group includes POI_2, and the occluded scene group includes POI_7 and POI_8. Furthermore, POI_1 is related to the visible built-in object B, POI_6 is related to the visible built-in object C, POI_9 is related to the visible built-in object E, and POI_3, POI_4, and POI_5 are related to the visible built-in object A.

Figure 4:
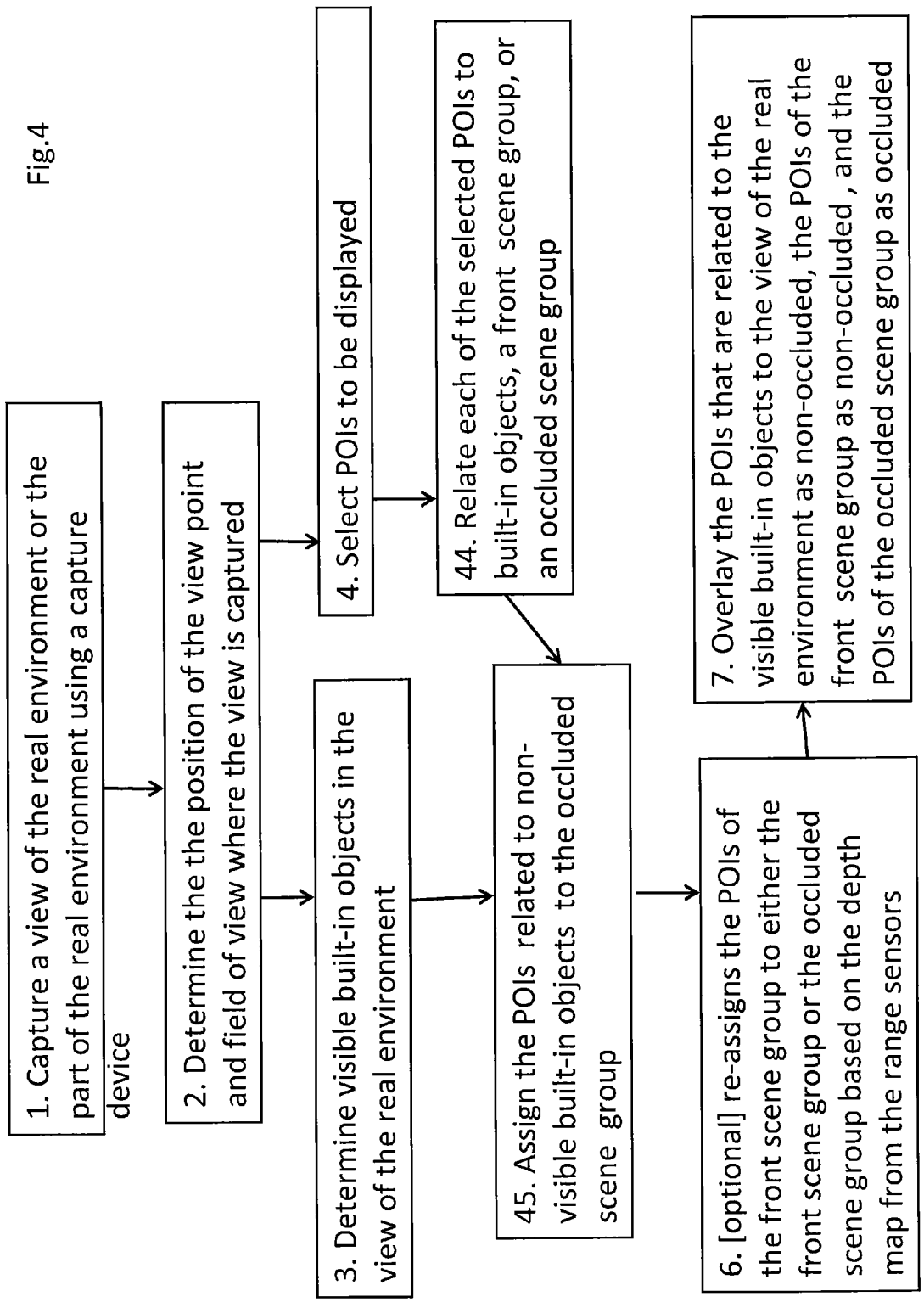
FIG. 4 shows a flowchart of another embodiment of a method according to the invention overlaying POIs to a view of the real environment in an augmented reality application.

Another embodiment of a method according to the invention is shown in FIG. 4. The embodiments shown in FIGS. 1 and 4 are corresponding to each other regarding steps 1, 2, 3, 4, 6, and 7. The difference of the embodiment according to FIG. 4 with respect to FIG. 1 lies in steps 44 and 45 as set out in the following.

According to the embodiment shown in FIG. 4, it is possible to relate each of the selected POIs to built-in objects, to a front scene group, or to an occluded scene group without the knowledge of visible built-in objects (step 44). As soon as the information of visible built-in objects is available from step 3, step 45 could assign the POIs related to non-visible built-in objects to the occluded scene group.

Figure 3B:
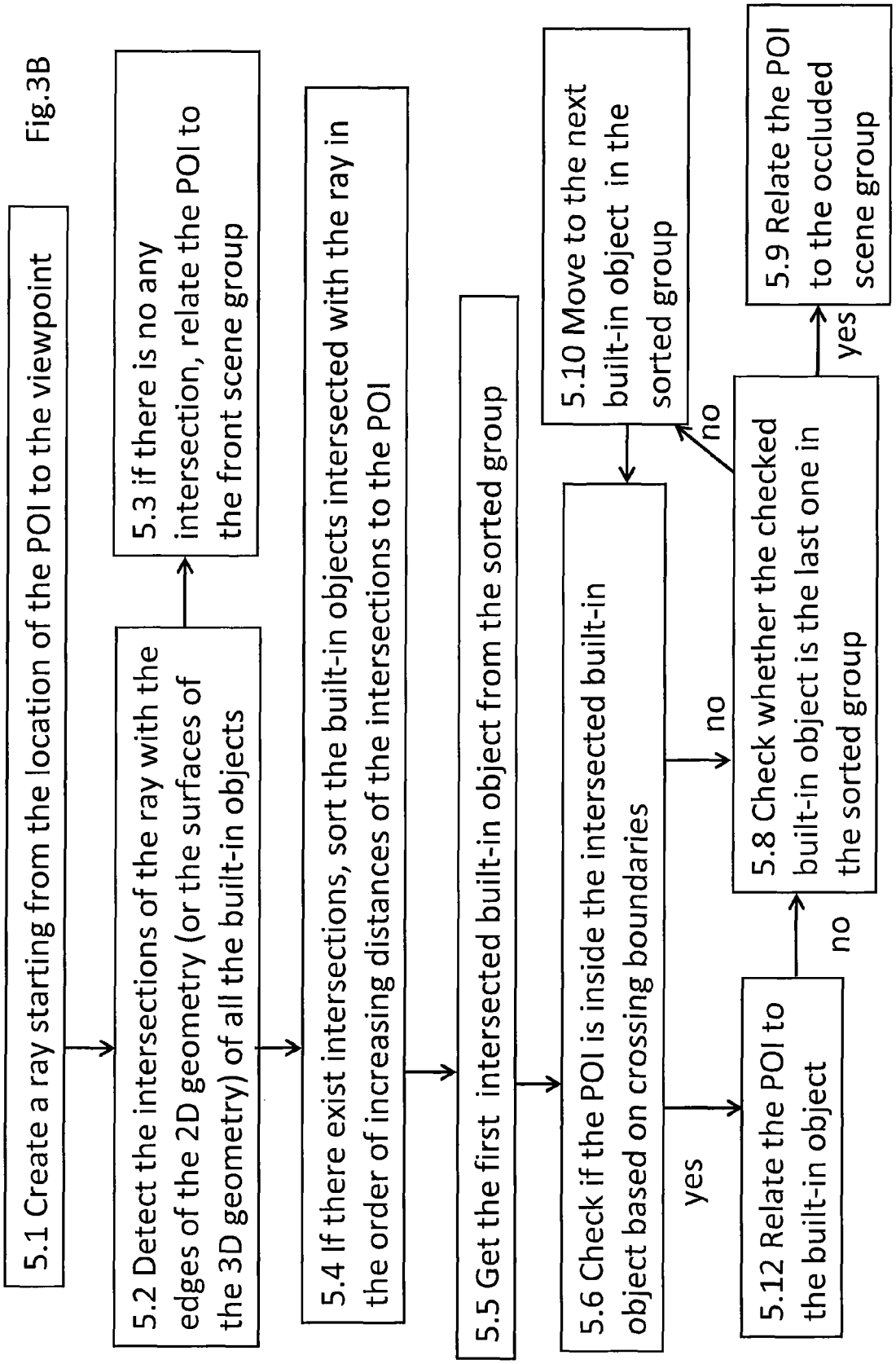
FIG. 3B shows a flowchart of another embodiment of relating a POI to built-in objects, a front scene group, or an occluded scene group.

FIG. 3B shows a potential implementation of relating each of the selected POIs to built-in objects, to a front scene group, or to an occluded scene group as an embodiment for implementing step 44 of FIG. 4. The embodiments shown in FIGS. 3A and 3B are corresponding to each other regarding steps 5.1, 5.2, 5.3, 5.4, 5.5, 5.6, and 5.8, 5.9, 5.10. The difference of the embodiment according to FIG. 3B with respect to FIG. 3A lies in step 5.12 instead of steps 5.7 and 5.11. In step 5.12, the POI is related to the respective built-in object regardless of whether it is visible or not. As soon as the information of visible built-in objects is available from step 3, step 45 in FIG. 4 assigns the POIs not yet assigned to the occluded scene group or the front scene group as shown in FIG. 3B and which are related to non-visible built-in objects to the occluded scene group. Any remaining built-in objects and their associated POIs are treated to belong to at least partially visible built-in objects.

According to both embodiments of FIGS. 1 and 4, step 7 overlays the POIs that are related to the visible built-in objects to the view of the real environment as non-occluded, the POIs of the front scene group as non-occluded, and the POIs of the occluded scene group as occluded. The occluded POIs may be shown semi-transparent, or in dash lines, while the non-occluded POIs could be shown opaquely, in solid lines, or in a different color as shown in FIG. 10.

Furthermore, the respective POI should preferably be overlaid to the view of the real environment in a usable and friendly way such that users could quickly and intuitively understand the real environment from the overlaid POI. The placements of the POIs in the view of the real environment could improve the usability and friendless of overlaying POI with the view of real environment. It is possible to place a POI that is related to a visible built-in object inside or close to the part of the view area of the visible built-in object. For this purpose, steps 3.2A, 3.5A and/or 3.5B could compute the part of the view area that each visible built-in object covers. For example, it is preferred to place POI_6 close to the area that the related visible built-in object C covers in the view 81 as shown in FIG. 10. Another example is placing POI_3, POI_4, and POI_5 at the area that the related visible built-in object A covers in the view 81 as shown in FIG. 10. Since the built-in object B is visible or partially visible in the view 81, the related POI_1 is placed at the image area of the built-in object B in the view 81.

Figure 11:
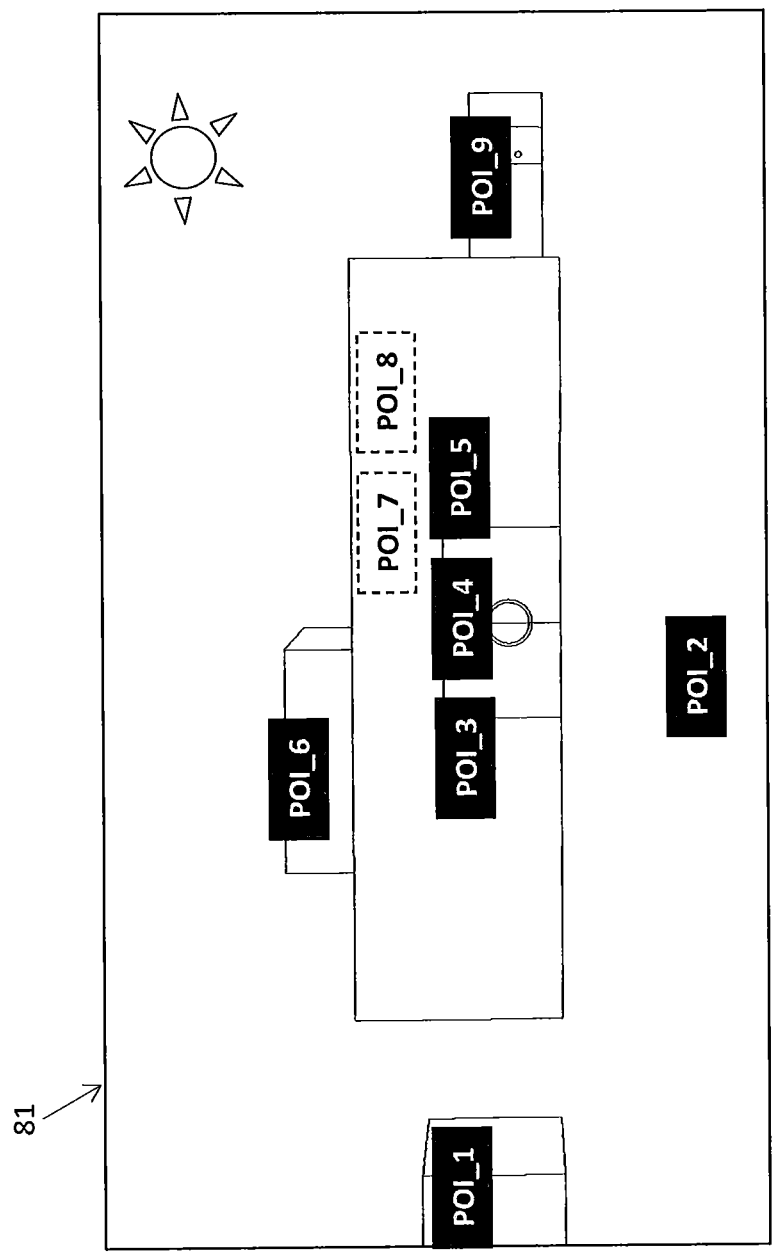
FIG. 11 shows another embodiment of a proper occlusion perception of overlaying POIs to the image of the scene of FIG. 8 according to an embodiment of the invention.

More particularly, it is preferred to place the POIs at a meaningful position in the view of the real environment. For a building that has entrances in the real environment, the POIs related to the building may be overlaid close to or inside the part of the view area that the entrances cover. POI_3, POI_4, and POI_5 are positioned at the entrance of the building A, and POI_9 is positioned at the entrance of the building E in the view 81 of the real environment 51 (FIG. 11). The image area of the entrances could be determined based on ray casting or rasterization using the 2D or 3D model in which the entrances are specified. The image based pattern recognition method could also detect the image area of an entrance based on visual properties of the entrances, such as different texture from the surrounding.

Furthermore, when the capture device locates inside a real object and captures a view of the indoor environment, the POIs related to the real object could be overlaid to the view in a different mode than the occlusion mode and non-occlusion mode. This could make the users be aware of that they are inside the real object.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

REFERENCES

1. US20120113138A1
2. US20120075341A1
3. US20120176410A1
4. Hoellerer, T., and S. Feiner. "Mobile augmented reality." Telegeoinformatics: Location-Based Computing and Services. Taylor and Francis Books Ltd., London, UK (2004).
5. Feiner, Steven, et al. "A touring machine: Prototyping 3D mobile augmented reality systems for exploring the urban environment." Personal and Ubiquitous Computing 1.4 (1997): 208-217.
6. Woop et al. "RPU: a programmable ray processing unit for realtime ray tracing." ACM Transactions on Graphics (TOG). Vol. 24. No. 3. ACM, 2005
7. Ivan Sutherland et al., "A Characterization of Ten Hidden-Surface Algorithms" 1974, ACM Computing Surveys vol. 6 no. 1.
8. "Point in Polygon, One More Time . . . ", Ray Tracing News, vol. 3 no. 4, Oct. 1, 1990.
9. Horvat. "Ray-casting point-in-polyhedron test." 2012

[0105]

The invention claimed is:

1. A method for representing virtual information in a view of a real environment, comprising the following steps:
providing a system setup comprising at least one display device, wherein the system setup is adapted for blending in virtual information on the display device;

determining a position of a viewing point relative to at least one component of the real environment;

providing a geometry model of the real environment, the geometry model comprising multiple representations of respective built-in real objects of the real environment, each representation comprising at least one 2D or 3D geometrical shape having at least one boundary delimiting the respective object, wherein one side of the boundary is delimiting the object toward its inner side and the other side of the boundary is delimiting the object toward its outer side;

providing at least one item of virtual information and a position of the at least one item of virtual information;

determining a visualization mode of blending in the at least one item of virtual information on the display device according to the position of the viewing point and the geometry model;

calculating a ray between the viewing point and the item of virtual information; and determining a number of boundary intersections by the ray;

wherein if the number of boundary intersections is less than 2, the item of virtual information is blended in in a non-occlusion mode, otherwise in an occlusion mode, and/or the position of the item of virtual information is moved to the front of the intersected boundary with respect to the viewing point.

2. The method according to claim 1, wherein the method is performed iteratively, where in each iteration a height of the item of virtual information is increased and the iteration is stopped, when the number of boundary intersections by the ray becomes less than 2 or when the height exceeds a predefined limit.

3. The method according to claim 1, wherein the determination of the visualization mode of items of virtual information is influenced by the distance of the virtual information to the viewing point and in case the item of virtual information is determined to be blended in in a non-occlusion mode, a graphical representation of the item of virtual information is added to the geometry model and is considered when determining the visualization mode of a following item of virtual information.

4. The method according to claim 1, wherein the geometry model is derived from a depth sensor source associated with the display device.

5. The method according to claim 1, wherein the geometry model is a 2D model of a real environment which describes a 2D geometry of the real environment with respect to a particular plane.

6. The method according to claim 1, wherein the geometry model describes at least one of the following attributes of the real environment: shape, symmetry, geometrical size, structure.

7. The method according to claim 1, wherein the geometry model is representative of a city map, a city blueprint, a floor plan of a building, or a blueprint of a shopping mall.

8. The method according to claim 1, wherein the geometry model is a 3D model of a real environment which describes a 3D geometry of the real environment.

9. The method according to claim 8, wherein the 3D model of the real environment is obtained from a 2D model and a dimension orthogonal to a ground plane of the 2D model.

10. The method according to claim 1, wherein in the geometry model the built-in real objects of the real environment refer to real objects represented by at least one of 2D and 3D geometrical shapes having at least one closed boundary.

11. The method according to claim 1, wherein items of virtual information related to occluded real objects are shown semi-transparent, or in dash lines, and items of virtual information related to at least partially visible real objects are shown opaquely, in solid lines, or in a different color.

12. The method according to claim 1, wherein the system setup is adapted for providing at least one view of the real environment by means of taking a picture and blending in virtual information on the display device such that the virtual information is superimposed with the real environment in at least part of the view.

13. The method according to claim 1, wherein the system setup is adapted for providing at least one rendered view of the real environment and blending in virtual information on the display device such that the virtual information is superimposed with the real environment in at least part of the view.

14. The method according to claim 1, wherein the system setup is adapted for providing at least one view of the real environment and blending in virtual information on a semi-transparent display device such that the virtual information is superimposed with the real environment in at least part of the view.

15. A non-transitory computer readable medium comprising software code sections adapted to perform a method for representing virtual information in a view of a real environment, which method comprises the following steps:

providing a system setup comprising at least one display device, wherein the system setup is adapted for blending in virtual information on the display device;

determining a position of a viewing point relative to at least one component of the real environment;

providing a geometry model of the real environment, the geometry model comprising multiple representations of respective built-in real objects of the real environment each representation comprising at least one 2D or 3D geometrical shape having at least one boundary delimiting the respective object, wherein one side of the boundary is delimiting the object toward its inner side and the other side of the boundary is delimiting the object toward its outer side;

providing at least one item of virtual information and a position of the at least one item of virtual information;

determining a visualization mode of blending in the at least one item of virtual information on the display device according to the position of the viewing point and the geometry model;

calculating a ray between the viewing point and the item of virtual information; and determining a number of boundary intersections by the ray;

wherein if the number of boundary intersections is less than 2, the item of virtual information is blended in in a non-occlusion mode, otherwise in an occlusion mode, and/or the position of the item of virtual information is moved to the front of the intersected boundary with respect to the viewing point.

* * * * *